United States Patent
Hill et al.

(10) Patent No.: US 6,577,291 B2
(45) Date of Patent: *Jun. 10, 2003

(54) GRAY SCALE AND COLOR DISPLAY METHODS AND APPARATUS

(75) Inventors: William Hill, Carnation, WA (US); Michael Duggan, Kirkland, WA (US); Leroy B. Keely, Jr., Portola Valley, CA (US); Gregory C. Hitchcock, Woodinville, WA (US); J. Turner Whitted, Pittsboro, NC (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,181

(22) Filed: Nov. 13, 1998

(65) Prior Publication Data

US 2002/0093476 A1 Jul. 18, 2002

Related U.S. Application Data

(63) Continuation-in-part of application No. 09/168,013, filed on Oct. 7, 1998.

(51) Int. Cl.$^7$ ................................................. G09G 3/36
(52) U.S. Cl. ............................. 345/89; 345/87; 345/88
(58) Field of Search ............................. 345/87, 88, 89, 345/90, 55, 432

(56) References Cited

U.S. PATENT DOCUMENTS

| 4,136,359 A | 1/1979 | Wozniak | 358/17 |
| 4,217,604 A | 8/1980 | Wozniak | 358/16 |

(List continued on next page.)

FOREIGN PATENT DOCUMENTS

| EP | 0330361 A2 | 8/1989 | G09G/1/28 |
| EP | 0435391 A2 | 7/1991 | G09G/3/20 |

(List continued on next page.)

OTHER PUBLICATIONS

Abram, G. et al. "Efficient Alias–free Rendering using Bit–masks and Look–Up Tables" *San Francisco*, vol. 19, No. 3, 1985 (pp. 53–59).

(List continued on next page.)

*Primary Examiner*—Vijay Shankar
(74) *Attorney, Agent, or Firm*—Workman, Nydegger & Seeley

(57) ABSTRACT

Display apparatus, and methods for displaying images, e.g., text, on gray scale and color monitors are described. Gray scale displays implemented in accordance with the present invention include displays having a resolution in a first dimension, e.g., the horizontal dimension, which is several time the resolution in a second dimension, e.g., the vertical dimension. Various other displays of the present invention are capable of operating as both gray scale and color display devices. In one such display, the color filter used to implement a color portion of the display is omitted from another, e.g., gray scale portion of the same display. In such an embodiment, text, e.g., captions, are displayed using the gray scale portion of the display while color images, e.g., graphics, are displayed on the color portion of the display. In another display of the present invention, a color filter with filter cells that can be switched between a color and a clear mode of operation are employed. When images, e.g., text, are to be displayed as gray scale images, the filter cells, corresponding to the portion of the display to be used to display the gray scale images, are switched to the clear mode of operation. In such an embodiment, the remaining portion or portions of the display may be used to display color images. Methods and apparatus for reducing and/or eliminating color distortions in images resulting from treating pixel sub-components as independent luminous intensity sources are also described.

17 Claims, 30 Drawing Sheets

U.S. PATENT DOCUMENTS

| | | | |
|---|---|---|---|
| 4,278,972 A | | 7/1981 | Wozniak ..................... 340/703 |
| 4,600,274 A | | 7/1986 | Morozumi ................... 350/339 |
| 4,703,318 A | | 10/1987 | Haggerty .................... 346/723 |
| 4,851,825 A | | 7/1989 | Naiman ....................... 340/728 |
| 5,057,739 A | | 10/1991 | Shimada et al. ........ 313/477 R |
| 5,113,455 A | | 5/1992 | Scott ........................... 382/47 |
| 5,122,783 A | | 6/1992 | Bassetti, Jr. ................ 340/701 |
| 5,153,577 A | | 10/1992 | Mackey et al. ............. 340/793 |
| 5,254,982 A | * | 10/1993 | Feigenblatt et al. ........ 345/148 |
| 5,298,915 A | | 3/1994 | Bassetti, Jr. ................ 345/149 |
| 5,334,992 A | * | 8/1994 | Rochat et al. ................ 345/22 |
| 5,334,996 A | | 8/1994 | Tanigaki et al. ............ 345/152 |
| 5,341,153 A | | 8/1994 | Benzschawel et al. ...... 345/152 |
| 5,349,451 A | | 9/1994 | Dethardt ..................... 358/518 |
| 5,404,432 A | | 4/1995 | Koopman et al. .......... 395/144 |
| 5,444,460 A | | 8/1995 | Fujitaka et al. ............. 345/144 |
| 5,467,102 A | | 11/1995 | Kuno et al. ..................... 345/1 |
| 5,502,490 A | * | 3/1996 | Tkanashi et al. ........... 358/296 |
| 5,543,819 A | | 8/1996 | Farwell et al. .............. 345/150 |
| 5,548,305 A | | 8/1996 | Rupel ......................... 345/150 |
| 5,555,360 A | | 9/1996 | Kumazaki et al. .......... 395/144 |
| 5,623,593 A | | 4/1997 | Spells, III ................... 395/172 |
| 5,633,654 A | | 5/1997 | Kennedy, Jr. et al. ...... 345/114 |
| 5,663,772 A | * | 9/1997 | Uehara et al. .............. 348/671 |
| 5,689,283 A | | 11/1997 | Shirochi ..................... 345/132 |
| 5,757,347 A | * | 5/1998 | Han ............................. 345/88 |
| 5,767,837 A | | 6/1998 | Hara ........................... 345/152 |
| 5,821,913 A | | 10/1998 | Mamiya ....................... 345/88 |
| 5,847,698 A | | 12/1998 | Reavey et al. .............. 345/173 |
| 5,894,300 A | | 4/1999 | Takizawa .................... 345/115 |
| 5,949,643 A | | 9/1999 | Batio .......................... 361/681 |
| 5,963,185 A | | 10/1999 | Havel ........................... 345/83 |
| 6,115,151 A | * | 9/2000 | Popovich ....................... 359/9 |
| 6,151,006 A | * | 11/2000 | Yanagi et al. ................. 345/94 |
| 6,211,859 B1 | * | 4/2001 | Lin et al. ....................... 345/47 |
| 6,232,947 B1 | * | 5/2001 | Miyawaki et al. ............ 345/99 |

FOREIGN PATENT DOCUMENTS

| | | | | |
|---|---|---|---|---|
| EP | | 0526135 A1 | 2/1993 | ......... G02F/1/1343 |
| EP | | 0673012 A2 | 9/1995 | ........... G09G/3/36 |
| JP | | 09073105 | 3/1997 | ........... G02F/1/139 |

OTHER PUBLICATIONS

Ahumada, A.J. et al. "43.1: A Simple Vision Model for Inhomogeneous Image–Quality Assessment" *1998 SID*.

Barbier, B. "25.1: Multi–Scale Filtering for Image Quality on LCD Matrix Displays" *SID 96 Digest*.

Barten, P.G.J. "Effect of Gamma on Subjective Image Quality" *SID 96 Digest*.

Beck. D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al. "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29, No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Densities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Digital Typography*, Seventh International Conference on Electronic Publishing, Mar. 30–Apr. 3, 1998, pp. 281–293.

Murch, G. et al. "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphcis Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest*.

Schmandt, C. "Soft Typography" Information Processing 80, *Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung. C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al. "43:3 How Fill Factor Affects Display Image Quality" (c) *1998 SID*.

"Cutting Edge Display Technology—The Diamond Vision Difference" www.amasis.com/diamondvision/technical.html, Jan. 12, 1999.

"The Effect of Line Length and Method of Movement on reading from screen" http://fontweb/internal/repository/research/linelength.asp?RES=ultra, 20 pages, Jun. 3, 1998.

"Exploring the Effect of Layout on Reading from Screen" http://fontweb/internal/repository/research/explore.asp?RES=ultra, 10 pages, Jun. 3, 1998.

"The Legibility of Screen Formats: Are Three Columns Better Than One?" http://fontweb/internal/repository/research/scrnformat.asp?RES=ultra, 16 pages, Jun. 3, 1998.

"Legibility on screen: A report on research into line length, document height and number of columns" http://fontweb/internal/repository/research/scrnlegi.asp?RES=ultra Jun. 3, 1998.

"Typographic Research" http://fontweb/internal/repository/research/research2.asp?RES=ultra Jun. 3, 1998.

"How Does Hinting Help?" http://www.microsoft.com/typography/hinting/how.htm/fname=%20&fsize, Jun. 30, 1997.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize Jun. 30, 1997.

"TrueType fundamentals" http://www.microsoft.com/OTSPEC/TTCHO1.htm?fname=%20&fsize=Nov. 16, 1997.

"True Type Hinting" http://www.microsoft.com/typography/hinting/hinting.htm Jun. 30, 1997.

* cited by examiner

GRAY SCALE AND COLOR DISPLAY METHODS AND APPARATUS

RELATED APPLICATIONS

The present application is a continuation-in-part of pending U.S. Patent application Ser. No. 09/168,013 titled "METHODS AND APPARATUS FOR RESOLVING EDGES WITHIN A DISPLAY PIXEL", which was filed Oct. 7, 1998 and which is hereby expressly incorporated by reference.

FIELD OF THE INVENTION

The present invention relates to methods and apparatus for displaying images, and more particularly, to display methods and apparatus which utilize multiple displaced portions of an output device, e.g., liquid crystal display, to represent an image.

BACKGROUND OF THE INVENTION

Color display devices have become the principal display devices of choice for most computer users. The display of color on a monitor is normally achieved by operating the display device to emit light, e.g., a combination of red, green, and blue light, which results in one or more colors being perceived by a human viewer.

In cathode ray tube (CRT) display devices, the different colors of light are generated via the use of phosphor coatings which may be applied as dots in a sequence on the screen of the CRT. A different phosphor coating is normally used to generate each of the three colors, red, green, and blue resulting in repeating sequences of phosphor dots which, when excited by a beam of electrons, will generate the colors red, green and blue.

The term pixel is commonly used to refer to one spot in, e.g., a rectangular grid of thousands of such spots. The spots are individually used by a computer to form an image on the display device. For a color CRT, where a single triad of red, green and blue phosphor dots cannot be addressed, the smallest possible pixel size will depend on the focus, alignment and bandwidth of the electron guns used to excite the phosphors. The light emitted from one or more triads of red, green and blue phosphor dots, in various arrangements known for CRT displays, tend to blend together giving, at a distance, the appearance of a single colored light source.

In color displays, the intensity of the light emitted corresponding to the additive primary colors, red, green and blue, can be varied to get the appearance of almost any desired color pixel. Adding no color, i.e., emitting no light, produces a black pixel. Adding 100 percent of all three colors results in white.

FIG. 1 illustrates a known portable computer 100, which comprises a housing 101, a disk drive 105, keyboard 104 and a flat panel display 102.

Portable personal computers 100 tend to use liquid crystal displays (LCD) or other flat panel display devices 102, as opposed to CRT displays. This is because flat panel displays tend to be small and lightweight as compared to CRT displays. In addition, flat panel displays tend to consume less power than comparably sized CRT displays making them better suited for battery powered applications than CRT displays.

As the quality of flat panel color displays continues to increase and their cost decreases, flat panel displays are beginning to replace CRT displays in desktop applications. Accordingly, flat panel displays, and LCDs in particular, are becoming ever more common.

Over the years, most image processing techniques, including the generation and display of fonts, e.g., sets of characters, on computer screens, have been developed and optimized for display on CRT display devices.

Unfortunately, existing text display routines fail to take into consideration the unique physical characteristics of flat panel display devices. These physical characteristics differ considerably from the characteristics of CRT devices particularly in regard to the physical characteristics of the RGB color light sources.

Color LCD displays are exemplary of display devices which utilize multiple distinctly addressable elements, referred to herein as pixel sub-elements or pixel sub-components, to represent each pixel of an image being displayed. Normally, each pixel on a color LCD display is represented by a single pixel element which usually comprises three non-square elements, i.e., red, green and blue (RGB) pixel sub-components. Thus, a set of RGB pixel sub-components together make up a single pixel element. LCD displays of the known type comprise a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB stripes running in the vertical direction.

FIG. 2A illustrates a known LCD screen 200 comprising a plurality of rows (R1–R12) and columns (C1–C16) which may be used as the display 102. Each row/column intersection forms a square which represents one pixel element. FIG. 2B illustrates the upper left hand portion of the known display 200 in greater detail.

Note in FIG. 2B how each pixel element, e.g., the (R1, C4) pixel element, comprises three distinct sub-element or sub-components, a red sub-component 206, a green sub-component 207 and a blue sub-component 208. Each known pixel sub-component 206, 207, 208 is ⅓ or approximately ⅓ the width of a pixel while being equal, or approximately equal, in height to the height of a pixel. Thus, when combined, the three ⅓ width pixel sub-components 206, 207, 208 form a single pixel element.

As illustrated in FIG. 2A, one known arrangement of RGB pixel sub-components 206, 207, 208 form what appear to be vertical color stripes down the display 200. Accordingly, the arrangement of ⅓ width color sub-components 206, 207, 208, in the known manner illustrated in FIGS. 2A and 2B, is sometimes called "vertical striping".

While only 12 rows and 16 columns are shown in FIG. 2A for purposes of illustration, common column×row ratios include, e.g., 640×480, 800×600, and 1024×768. Note that known display devices normally involve the display being arranged in landscape fashion, i.e., with the monitor being wider than it is high as illustrated in FIG. 2A, and with stripes running in the vertical direction.

LCDs are are manufactured with pixel sub-components arranged in several additional patterns including, e.g., zig-zags and a delta pattern common in camcorder view finders. While features of the present invention can be used with such pixel sub-component arrangements, since the RGB striping configuration is more common, the exemplary embodiments of the present invention will be explained in the context of using RGB striped displays.

Traditionally, each set of pixel sub-components for a pixel element is treated as a single pixel unit. Accordingly, in known systems luminous intensity values for all the pixel sub-components of a pixel element are generated from the same portion of an image. Consider for example, the image represented by the grid 220 illustrated in FIG. 2C. In FIG. 2C each square represents an area of an image which is to be represented by a single pixel element, e.g., a red, green and blue pixel sub-component of the corresponding square of the grid 230. In FIG. 2C a shaded circle is used to represent a single image sample from which luminous intensity values are generated. Note how a single sample 222 of the image 220 is used in known systems to generate the luminous intensity values for each of the red, green, and blue pixel sub-components 232, 233, 234. Thus, in known systems, the RGB pixel sub-components are generally used as a group to generate a single colored pixel corresponding to a single sample of the image to be represented.

The light from each pixel sub-component group effectively adds together to create the effect of a single color whose hue, saturation, and intensity depend on the value of each of the three pixel sub-components. Say, for example, each pixel sub-component has a potential intensity of between 0 and 255. If all three pixel sub-components are given 255 intensity, the pixel will be perceived as being white. However, if all three pixel sub-components are given a value turning off each of the three pixel sub-components, the pixel will be perceived as black. By varying the respective intensities of each pixel sub-component, it is possible to generate millions of colors in between these two extremes.

Since, in the known system a single sample is mapped to a triple of pixel sub-components which are each ⅓ of a pixel in width, spatial displacement of the left and right pixel sub-components occurs since the centers of these elements are ⅓ from the center of the sample.

Consider for example that an image to be represented was a red cube with green and blue components equal to zero. As a result of the displacement between the sample and green image sub-component, when displayed on an LCD display of the type illustrated in FIG. 2A, the apparent position of the cube on the display will be shifted ⅓ of a pixel to the left of its actual position. Similarly, a blue cube would appear to be displaced ⅓ of a pixel to the right. Thus, known imaging techniques used with LCD screens can result in undesirable image displacement errors.

Text characters represent one type of image which is particularly difficult to accurately display given typical flat panel display resolutions of 72 or 96 dots (pixels) per inch (dpi). Such display resolutions are far lower than the 600 dpi supported by most printers and the even higher resolutions found in most commercially printed text such as books and magazines.

Because of the relatively low display resolution of most video display devices, not enough pixels are available to draw smooth character shapes, especially at common text sizes of 10, 12, and 14 point type. At such common text rendering sizes, gradations between different sizes and weights, e.g., the thickness, of the same typeface, are far coarser than their print equivalent.

The relatively coarse size of standard pixels tends to create aliasing effects which give displayed type characters jagged edges. For example, the coarse size of pixels tends to result in the squaring off of serifs, the short lines or ornaments at the ends, e.g., bottom, of strokes which form a typeface character. This makes it difficult to accurately display many highly readable or ornamental typefaces which tend to use serifs extensively.

Such problems are particularly noticeable in the stems, e.g., thin vertical portions, of characters. Because pixels are the minimum display unit of conventional monitors, it is not possible to display stems of characters using conventional techniques with less than one pixel stem weight. Furthermore, stem weight can only be increased a pixel at a time. Thus, stem weights leap from one to two pixels wide. Often one pixel wide character stems are too light, while two pixel wide character stems are too bold. Since creating a boldface version of a typeface on a display screen for small characters involves going from a stem weight of one pixel to two pixels, the difference in weight between the two is 100%. In print, bold might typically be only 20 or 30 percent heavier than its equivalent regular or Roman face. Generally, this "one pixel, two pixel" problem has been treated as an inherent characteristic of display devices which must simply be accepted.

Prior work in the field of displaying characters has focused, in part, on the development of anti-aliasing technologies designed to improve the display of characters on CRT displays. A commonly used anti-aliasing technique involves using shades of gray for pixels which include edges of the character. In effect, this smudges shapes, reducing spatial frequency of the edges but better approximating the intended character shapes. While known anti-aliasing techniques can significantly improve the quality of characters displayed on a CRT display device, many of these techniques are ineffective when applied to LCD display devices which differ considerably from CRT displays in terms of pixel sub-component arrangement.

A further issue is that such anti-aliasing techniques work reasonably well on large sizes of text, but at the sizes most suited for human reading—typically between 8 and 13 points—they have the effect of blurring the text. For the human reader, the effect is similar to trying to read with someone else's eyeglass prescription. The reader's eye tries continually to focus on an image which is inherently unfocusable. This leads quickly to eyestrain and fatigue, making conventional anti-aliasing unsatisfactory in cases for sustained reading.

While anti-aliasing techniques have helped the aliasing problem associated with displaying relatively low resolution representations of text, at least on CRT displays, the problem of pixel size and the inability to accurately display character stem widths have, prior to the present invention, been considered a fixed characteristic of display devices which must be tolerated.

In view of the above, it is apparent that there is a need for new and improved methods and apparatus for displaying text on flat panel display devices. It is desirable that at least some of the new methods be suitable for use with existing display device and computers. It is also desirable that at least some methods and apparatus be directed to improving the quality of displayed text on new computers using, e.g., new display devices and/or new methods of displaying text.

While the display of text, which is a special case of graphics, is of major concern in many computer applications, there is also a need for improved methods and apparatus for displaying other graphics, geometric shapes, e.g., circles, squares, etc., and captured images such as photographs, accurately and clearly.

SUMMARY OF THE PRESENT INVENTION

The present invention is directed to methods and apparatus for displaying images utilizing multiple distinct portions of an output device, e.g., an LCD display, to represent a single pixel of an image.

The inventors of the present application recognize the well-known principle that humans are much more sensitive to edges of luminance, where light intensity changes, than to edges of chrominance, where color intensity changes. This is why it is very difficult to read red text on a green background, for example. They also recognize the well-known principle that humans are not equally sensitive to the colors of red, green and blue. In fact, of 100 percent luminous intensity in a fully white pixel the red pixel sub-component contributes approximately 30% to the overall perceived luminance, green 60% and blue 10%.

Various features of the present invention are directed to utilizing the individual pixel sub-components of a display as independent luminous intensity sources thereby increasing the effective resolution of a display by as much as a factor of 3 in the dimension perpendicular to the direction of the RGB striping. This allows for a significant improvement in visible resolution.

While the methods of the present invention may result in some degradation in chrominance quality as compared to known display techniques, as discussed above humans are more sensitive to edges of luminance than of chrominance. Accordingly, the present invention can provide significant improvements in the quality of images, compared to known rendering techniques, even when taking into consideration the negative impact the techniques of the present invention may have on color quality.

As discussed above, known monitors tend to use vertical striping. Because character stems occur in the vertical direction the ability to accurately control the thickness of vertical lines when rendering horizontally flowing text tends to be more important than the ability to control the thickness of horizontal lines. With this in mind, it was concluded that, at least for text applications, it is often more desirable to have a monitor's maximum resolution in the horizontal, as opposed to vertical direction. Accordingly, various display devices implemented in accordance with the present invention utilize vertical, as opposed to horizontal, RGB striping. This provides such monitors, when used in accordance with the present invention, greater resolution in the horizontal direction than in the vertical direction. The present invention can however be applied similarly to monitors with horizontal RGB striping resulting in improved resolution in the vertical direction as compared to conventional image rendering techniques.

In addition to new display devices which are suitable for use when treating pixel sub-components as independent luminous intensity sources, the present invention is directed to new and improved text, graphics and image rendering techniques which facilitate pixel sub-component use in accordance with the present invention.

The display of images, including text, involves several steps including, e.g., image scaling, hinting and scan conversion.

An image scaling technique of the present invention involves scaling geometric representations of text, in the dimension perpendicular to the direction of RGB striping, at a rate that is greater than the rate of scaling in the direction of RGB striping. Such a non-uniform scaling technique allows subsequent processing operations to take full advantage of the effective increase in resolution obtained by treating pixel sub-components as individual luminous intensity sources. Scaling in the direction perpendicular to the striping may also be made a function of one or more weighting factors used in a subsequent scan conversion operation. Accordingly scaling in the direction perpendicular to the striping may be many times, e.g., 10 times, the scaling performed in the direction of the striping.

In addition to new scaling methods, the present invention is directed to new methods of performing hinting operations. These methods take into consideration pixel sub-component boundaries within an image, in addition to pixel boundaries considered in known hinting operations. Some hinting operations performed for use with display devices with vertical striping involve, as a step, aligning characters along pixel sub-component boundaries so that the character stem borders on, or even within, a red, blue or green pixel sub-component, as opposed to always between blue and red pixel sub-components as occurs at the whole pixel edge.

Other hinting operations may be performed for use with display devices with horizontal striping. Such hinting operations involve as a step, aligning character bases along pixel sub-component boundaries so that the character bases border on or within red or blue pixel sub-components, as opposed to a whole pixel edge.

In accordance with the present invention, as part of a hinting operation the width of vertical and/or horizontal lines within an image may be adjusted as a function of pixel sub-component boundaries. This allows for the hinting processes to perform finer adjustments when distorting an image's shape than in known systems where hinting is performed as a function of the location of whole pixel boundaries (edges) as opposed to pixel sub-component boundaries.

Scan conversion normally follows hinting. Scan conversion is the process by which geometric representations of images are converted into bitmaps. Scan conversion operations of the present invention involve mapping different portions of an image into different pixel sub-components. This differs significantly from known scan conversion techniques where the same portion of an image is used to determine the luminous intensity values to be used with each of the three pixel sub-components which represent a pixel.

As a result of treating RGB pixel sub-components as independent luminous intensity sources, color fringing effects may be encountered. One feature of the present invention is directed to processing bitmapped images to detect undesirable color fringing effects. Another feature of the invention is directed to performing color processing operations on bitmapped images to lessen or compensate for undesirable color fringing effects.

Other features of the present invention are directed to gray scale displays, and displays capable of displaying gray scale images, e.g., text, and color images.

The present invention includes a gray scale monitor with rectangular display elements that provide a resolution in a first dimension, e.g., the horizontal dimension, which is a multiple of the resolution in a second dimension perpendicular to the first dimension, e.g., the vertical direction. In one exemplary embodiment, a gray scale display is provided which has 3 times the resolution in the horizontal dimension than it has in the vertical dimension.

Displays, e.g., LCD displays, which are capable of operating as both gray scale and color display devices are also contemplated. In one such display, the color filter used to implement a color portion of the display is omitted from a separate gray scale portion of the display. Text, e.g., captions, are displayed using the gray scale portion of the display while color images, e.g., graphics, are displayed using the color portion of the display.

In another display of the present invention, a color filter with filter cells that can be switched between a color and a clear mode of operation are employed. When images, e.g., text, are to be displayed as gray scale images, the filter cells, corresponding to the portion of the display to be used to display the gray scale images, are switched to the clear mode of operation. In such an embodiment, the remaining portion or portions of the display may be used to display color images.

Numerous additional features, embodiments, and advantages of the methods and apparatus of the present invention are set forth in the detailed description which follows.

BRIEF DESCRIPTION OF THE DRAWINGS

FIG. 16 illustrates how the character of FIG. 15 would be illustrated using known techniques.

FIGS. 17–20 illustrate different ways of illustrating the character shown in FIG. 15 in accordance with various text rendering techniques of the present invention.

DETAILED DESCRIPTION

As discussed above, the present invention is directed to methods and apparatus for displaying images, e.g., text and/or graphics, on display devices which are capable of utilizing multiple distinct sections of an output device, e.g., the pixel sub-components of a liquid crystal display, to represent a single pixel of an image.

Various methods of the present invention are directed to using each pixel sub-component as a separate independent luminous intensity source as opposed to treating the set of RGB pixel sub-components which comprise a pixel as a single luminous intensity unit. This allows for a display device with RGB horizontal or vertical striping to be treated as having an effective resolution in the dimension perpendicular to the direction of the striping that is up to 3 times greater than in the dimension off the striping. Various apparatus of the present invention are directed to display devices and control apparatus which take advantage of the ability to individually control sub-pixel components.

Figure 4:
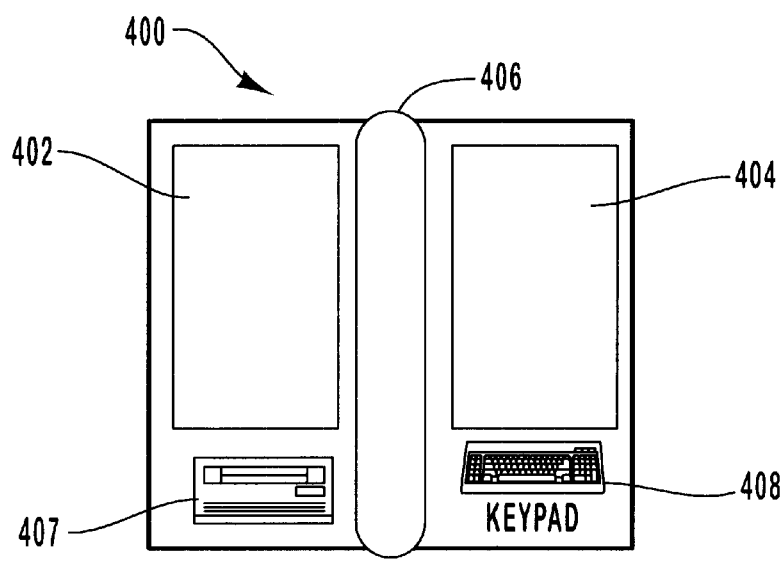
FIG. 4 illustrates an electronic book with flat panel displays arranged in a portrait arrangement in accordance with one embodiment of the present invention.

FIG. 4 illustrates a computerized electronic book device 400 implemented in accordance with one embodiment of the present invention. As illustrated in FIG. 4, the electronic book 400 comprises first and second display screens 402, 404 for displaying odd and even pages of a book, respectively. The electronic book 400 further comprises an input device, e.g., keypad or keyboard 408 and a data storage device, e.g., CD disk drive 407. A hinge 406 is provided so that the electronic book 400 can be folded protecting the displays 402, 404 when not in use. An internal battery may be used to power the electronic book 400. Similarly, other portable computer embodiments of the present invention may be powered by batteries.

Figure 5:
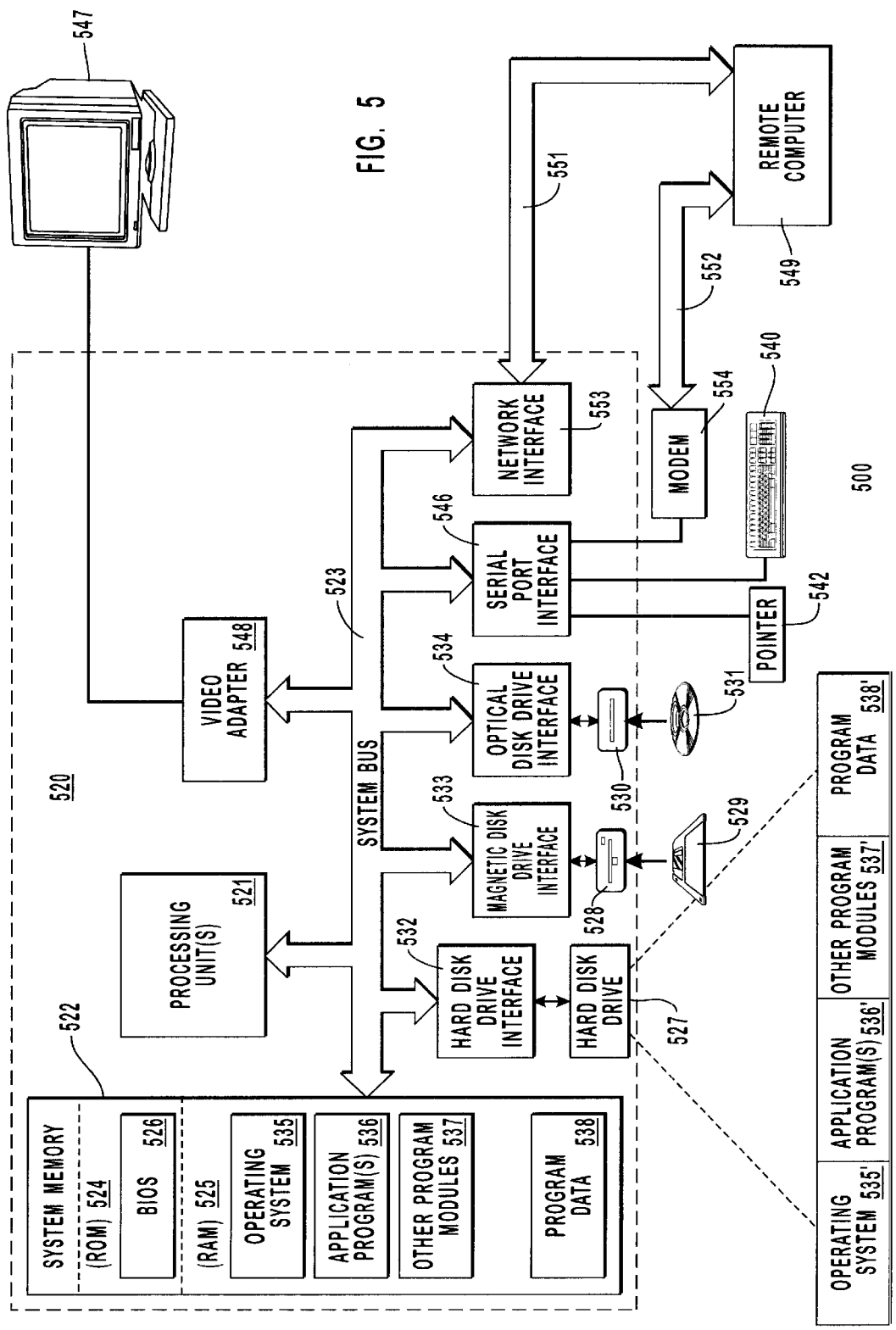
FIG. 5 illustrates a computer system implemented in accordance with the present invention.

FIG. 5 and the following discussion provide a brief, general description of an exemplary apparatus in which at least some aspects of the present invention may be implemented. Various methods of the present invention will be described in the general context of computer-executable instructions, e.g., program modules, being executed by a computer device such as the electronic book 400 or a personal computer. Other aspects of the invention will be described in terms of physical hardware such as, e.g., display device components and display screens.

The methods of the present invention may be effected by other apparatus than the specific described computer devices. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 5, an exemplary apparatus 500 for implementing at least some aspects of the present invention includes a general purpose computing device, e.g., personal computer 520. The personal computer 520 may include a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory 522 may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 527, magnetic disk 529, (magneto) optical disk 531, ROM 524 or RAM 525, such as an operating system 535, one or more application programs 536, other program modules 537, and/or program data 538 for example. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus 523. However, input devices may be connected by other interfaces, such as a parallel port, a game port or a universal serial bus (USB). A monitor 547 or other type of display device may also be connected to the system bus 523 via an interface, such as a video adapter 548 for example. The apparatus 500 may be used to implement the book 400 through the addition of a second display device. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520. The logical connections depicted in FIG. 5 include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 7A:
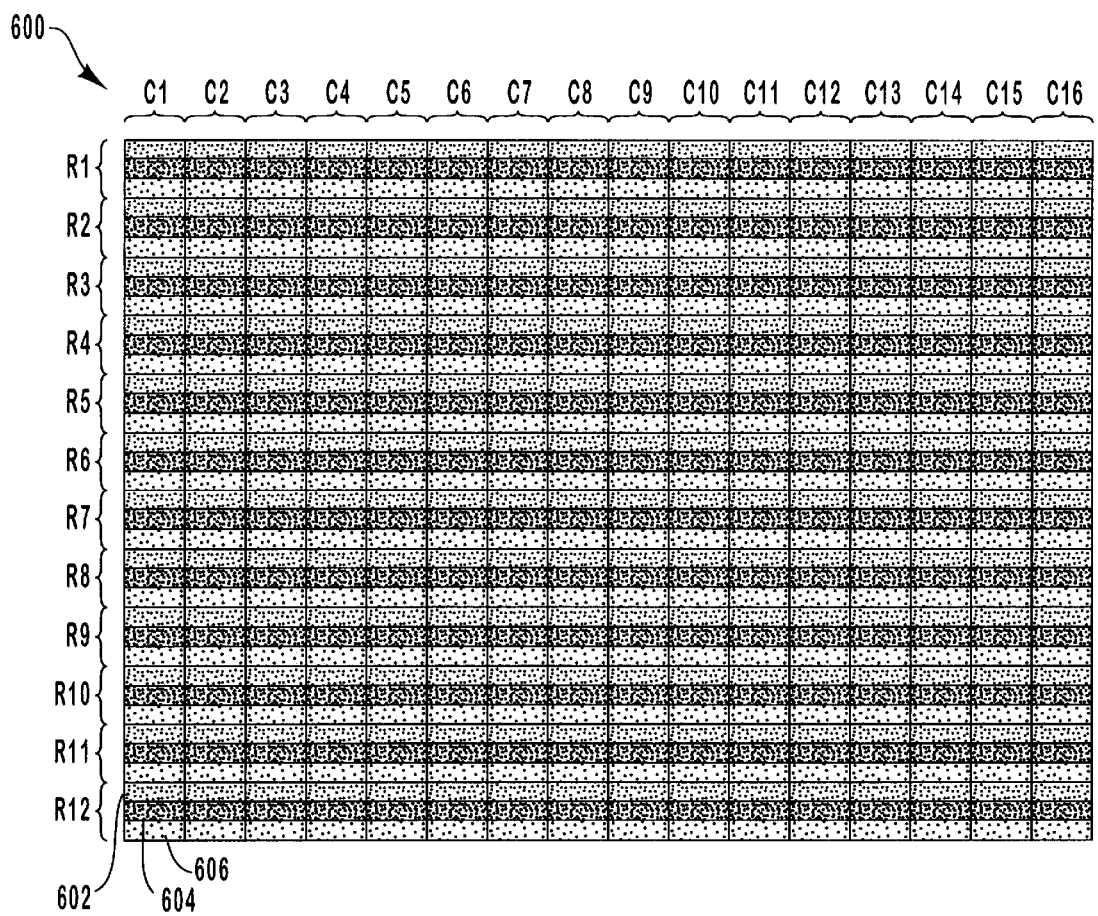
FIG. 7A illustrates a color flat panel display screen implemented in accordance with the present invention.

FIG. 7A illustrates a display device 600 implemented in accordance with an embodiment of the present invention. The display device 600 is suitable for use in, e.g., portable computers or other systems where flat panel displays are desired. The display device 600 may be implemented as an LCD display. In one embodiment the display and control logic of the known computer 100 are replaced by the display device 600 and display control logic, e.g., routines, of the present invention to provide a portable computer with horizontal RGB striping and pixel sub-components which are used to represent different portions of an image.

As illustrated, the display device 600 includes 16 columns of pixel elements C1–C16 and 12 rows of pixel elements R1–R12 for a display having 16×12 pixels. The display 600 is arranged to be wider than it is tall as is the case with most computer monitors. While the display 600 is limited to 16×12 pixels for purposes of illustration in the patent, it is to be understood that monitors of the type illustrated in FIG. 7A can have any number of vertical and horizontal pixel elements allowing for displays having, e.g., 640×480, 800×600, 1024×768 and 1280×1024 ratios of horizontal to vertical pixel elements as well as ratios resulting in square displays.

Each pixel element of the display 600 includes 3 sub-components, a red pixel sub-component 602, a green pixel sub-component 604, and a blue pixel sub-component 606. In the FIG. 7A embodiment, each pixel sub-component 602, 604, 606 has a height that is equal to, or approximately equal to, $\frac{1}{3}$ the height of a pixel and a width equal to, or approximately equal to, the width of the pixel.

In the monitor 600, the RGB pixel sub-components are arranged to form horizontal stripes. This is in contrast to the vertical striping arrangement used in the previously discussed monitor 200. The monitor 600 may be used, e.g., in particular graphics applications where, because of the application, it is desirable to have a greater vertical, as opposed to horizontal resolution.

Figure 7B:
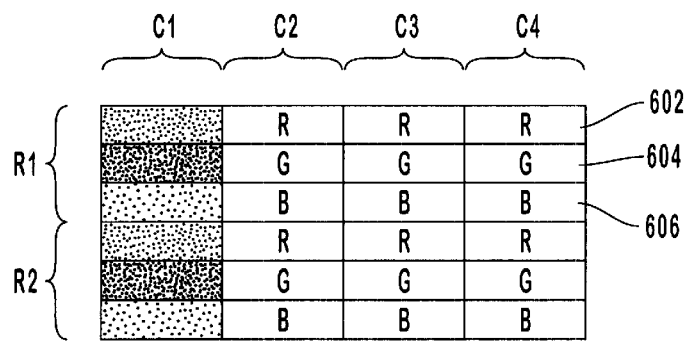
FIG. 7B illustrates a portion of the display screen of FIG. 7A.

FIG. 7B illustrates the upper left hand portion of the display 600 in greater detail. In FIG. 7B, the horizontal RGB striping pattern is clearly visible with the letters R, G and B being used to indicate correspondingly colored pixel sub-components.

Figure 7C:
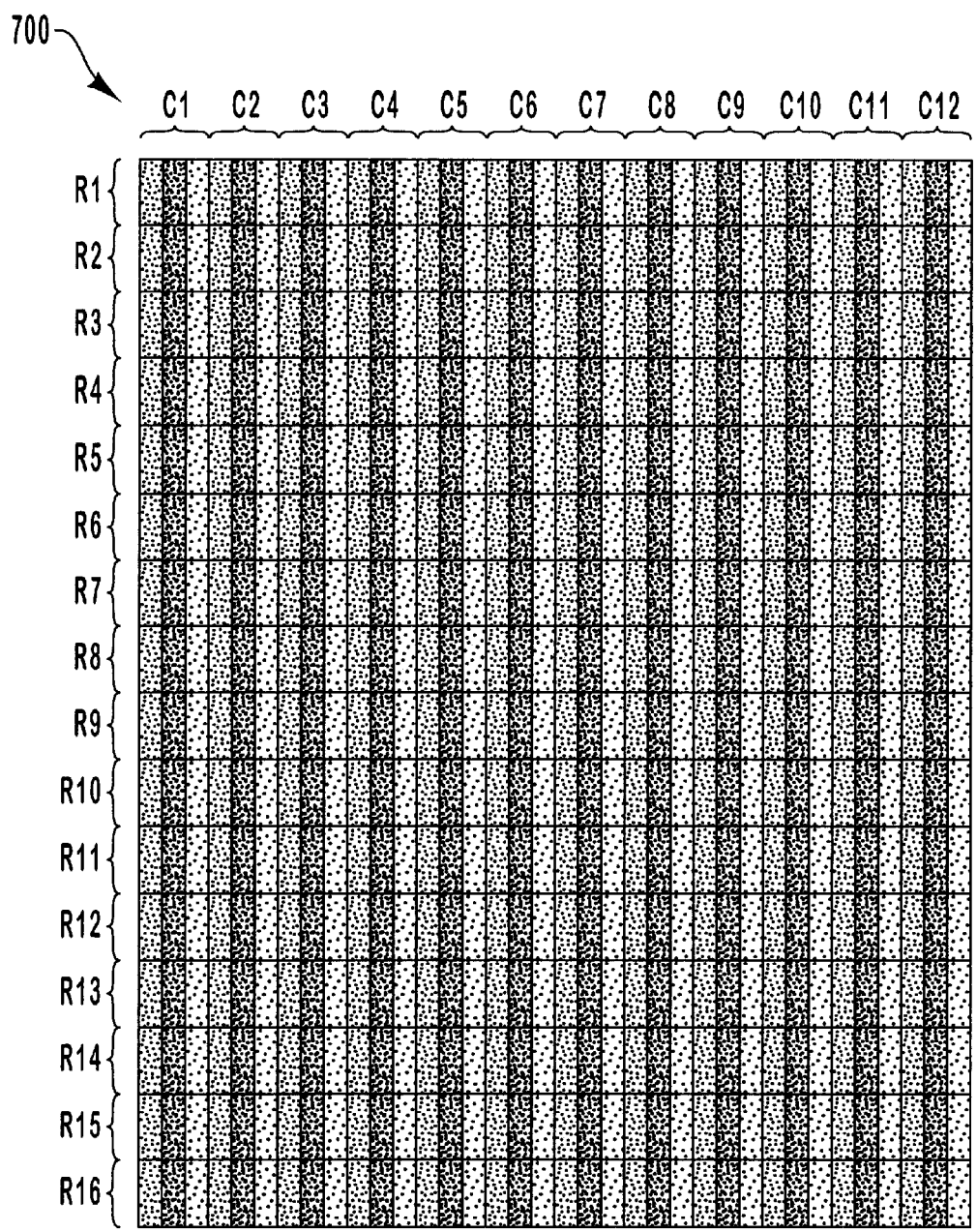
FIG. 7C illustrates a display screen implemented in accordance with another embodiment of the present invention.

FIG. 7C illustrates another display device 700 implemented in accordance with the present invention. FIG. 7C illustrates the use of vertical RGB striping in a display device, e.g., an LCD display, having more vertical pixel elements than horizontal pixel elements. While a 12×16 display is illustrated, it is to be understood that the display 700 may be implemented with any number of columns/rows of pixels, including column/row ratios which result in square displays.

The display device 700 is well suited where a portrait type display of horizontally flowing text is desired. A display device of the type illustrated in FIG. 7C may be used as the displays 402, 404 of the electronic book 400. As with the monitor of FIG. 2A, each pixel element is comprised of 3 pixel sub-components components, i.e., an R, G, and B pixel sub-component.

While the display 7A may be desirable for certain graphics applications, the accurate representation of character stems, the relatively long thin vertical portions of characters, is far more important than the representation of serifs in generating high quality characters. Vertical striping has the distinct advantage, when used according to the present invention, of allowing for stems which can be adjusted in width ⅓ of a pixel at a time. Thus, using a display device such as the device 200 or 700 with a vertical striping arrangement in conjunction with the display methods of the present invention, can provide higher quality text than the known horizontal striping arrangement which limits stem width adjustments to 1 pixel increments.

Another advantage of vertical striping is that it allows for adjustments in character spacing in increments of less than a pixel size in width, e.g., ⅓ of a pixel size increments. Character spacing is a text characteristic which is important to legibility. Thus, using vertical striping can produce improved text spacing as well as finer stem weights.

Figure 8:
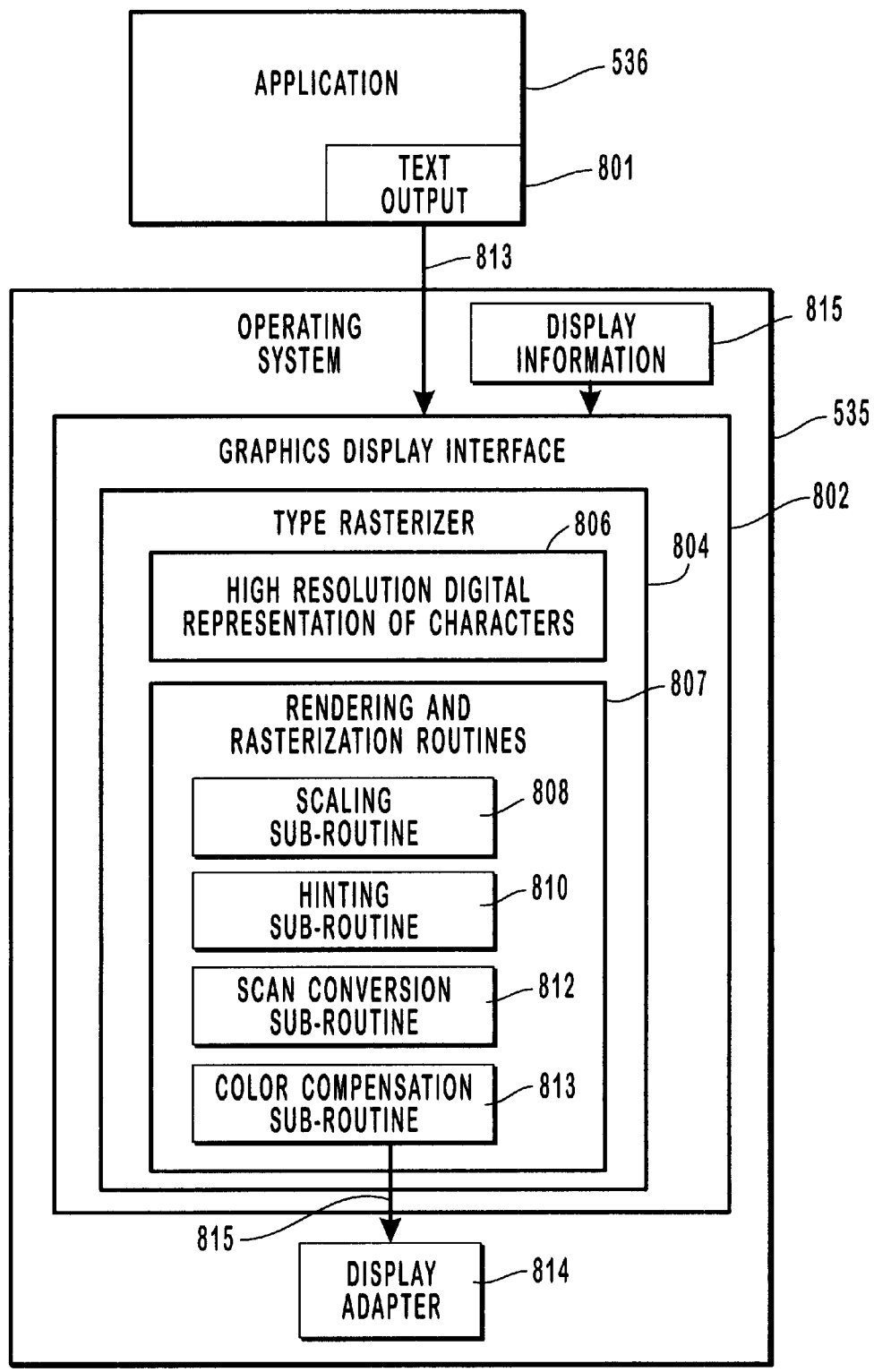
FIG. 8 illustrates various elements, e.g., routines, included in the memory of the computer system of FIG. 5, used for rendering text images on the computer system's display.

FIG. 8 illustrates various elements, e.g., routines, included in the memory of the computer system of FIG. 5, used to render text images on the computer system's display in accordance with the present invention.

As illustrated, the application routine 536, which may be, e.g., a word processor application, includes a text output sub-component 801. The text output sub-component 801 is responsible for outputting text information, as represented by arrow 813, to the operating system 535 for rendering on the display device 547. The text information includes, e.g., information identifying the characters to be rendered, the font to be used during rendering, and the point size at which the characters are to be rendered.

The operating system 535 includes various components responsible for controlling the display of text on the display device 547. These components include display information 815, a display adapter 814, and a graphics display interface 802. The display information 815 includes, e.g., information on scaling to be applied during rendering and/or foreground/background color information. The display adapter receives bitmap images from the graphics display interface 802 and generates video signals which are supplied to video adapter 548 for optical presentation by the display 547. The arrow 815 represents passing of the bitmap images from the graphics display interface 802 to the display adapter 814.

The graphics display interface 802 includes routines for processing graphics as well as text. Element 804 is a type rasterizer used to process text. The type rasterizer 804 is responsible for processing the text information obtained from the application 536 and generating a bitmap representation therefrom. The type rasterizer 804 includes character data 806 and rendering and rasterization routines 807.

The character data 806 may include, e.g., vector graphics, lines, points and curves, which provide a high resolution digital representation of one or more sets of characters.

Figure 3:
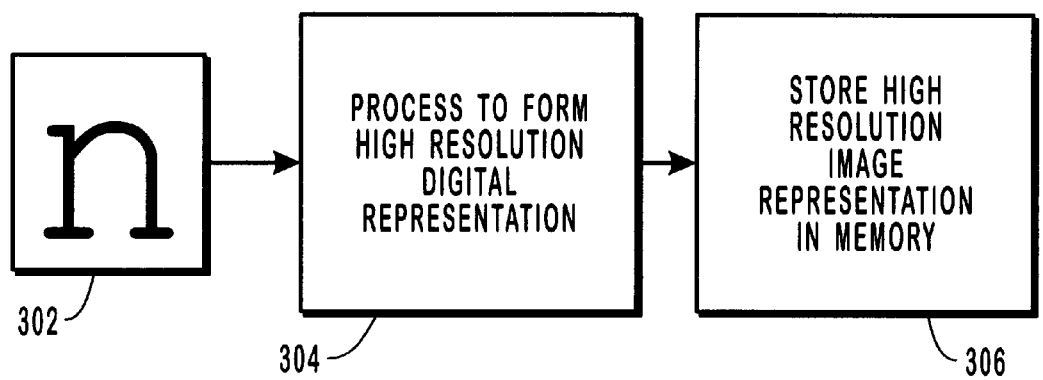
FIG. 3 illustrates known steps involved in preparing and storing character information for use in the subsequent generation and display of text.

As illustrated in FIG. 3, it is known to process text characters 302 to generate high resolution digital representations thereof, such as the data 806, which can be stored in memory for use during text generation. Accordingly, the generation 304 and storage 306 of data 806, will not be discussed herein in any detail.

The rendering and rasterization routines 807 include a scaling sub-routine 808, a hinting sub-routine 810, a scan conversion sub-routine 812 and a color compensation sub-routine 813. While performing scaling, hinting and scan conversion operations to render text images is common place, the routines and sub-routines of the present invention differ from known routines in that they take into consideration, utilize, or treat a screen's RGB pixel sub-components as separate luminous intensity entities which can be used to represent different portions of an image to be rendered. The color compensation sub-routine 813 is responsible for performing color compensation adjustments on the bitmap image created by the scan conversion sub-routine 812 to compensate for undesirable color fringing effects that may result from treating each of the three color sub-components of a pixel as separate luminous intensity elements. The operations performed by each of the sub-routines 808, 810, 812, and 813 of the present invention will be explained in detail below.

Figure 9A:
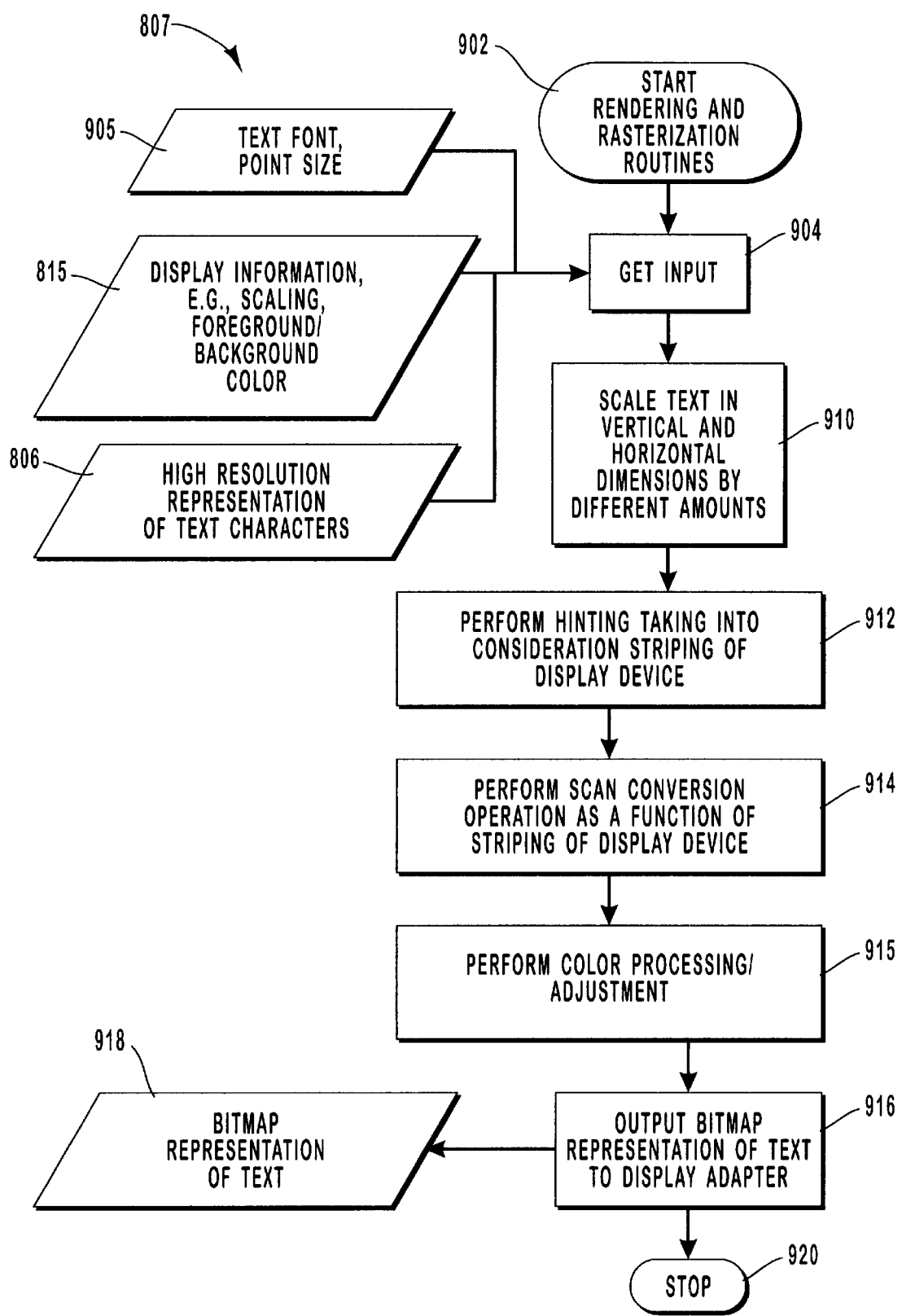
FIG. 9A illustrates a method of rendering text for display in accordance with one embodiment of the present invention.

FIG. 9A illustrates the rendering and rasterization routines 807 used for rendering text for display in accordance with the present invention. As illustrated, the routines 807 begin in step 902 wherein the routines are executed, e.g., under control of the operating system 535, in response to the receipt of text information from the application 536. In step 904 input is received by text rendering and rasterization routines 807. The input includes text, font, and point size information 905 obtained from the application 536. In addition, the input includes scaling information and/or foreground/background color information and pixel size information 815 obtained, e.g., from monitor settings stored in memory by the operating system. The input also includes the data 806 which includes a high resolution representation, e.g., in the form of lines, points and/or curves, of the text characters to be displayed.

With the input received in step 904, operation proceeds to step 910 wherein the scaling subroutine 808 is used to perform a scaling operation. In accordance with the present invention non-square scaling is performed as a function of the direction and/or number of pixel sub-components included in each pixel element. In particular, the high resolution character data 806, e.g., the line and point representation of characters to be displayed as specified by the received text and font information, is scaled in the direction perpendicular to the striping at a greater rate than in the direction of the striping. This allows for subsequent image processing operations to take advantage of the higher degree of resolution that can be achieved by using individual pixel sub-components as independent luminous intensity sources in accordance with the present invention.

Thus, when displays of the type illustrated in FIG. 7A are used as the device upon which data is to be displayed, scaling is performed in the vertical direction at a rate that is greater than that performed in the horizontal direction. When screens with vertical striping, e.g., screens illustrated in FIGS. 2 and 7C, are used, scaling is performed in the horizontal direction at a rate that is greater than that performed in the vertical direction.

The difference in scaling between the vertical and horizontal image directions can vary depending on the display used and the subsequent scan conversion and hinting processes to be performed. Display information including scaling information obtained in step 904 is used in step 910 to determine the scaling to be performed in a given embodiment.

In various embodiments of the present invention, scaling is performed in the direction perpendicular to the striping at a rate which is unrelated to the number of pixel sub-components which form each pixel. For example, in one embodiment where RGB pixel sub-components are used to form each pixel, scaling is performed in the direction perpendicular to the striping at a rate 20 times the rate at which scaling is performed in the direction of the striping. In most cases, the scaling of characters or images is, but need not be, performed in the direction perpendicular to the striping at a rate which allows further dividing the red, green and blue stripes in proportion to their luminous intensity contributions.

Figure 10A:
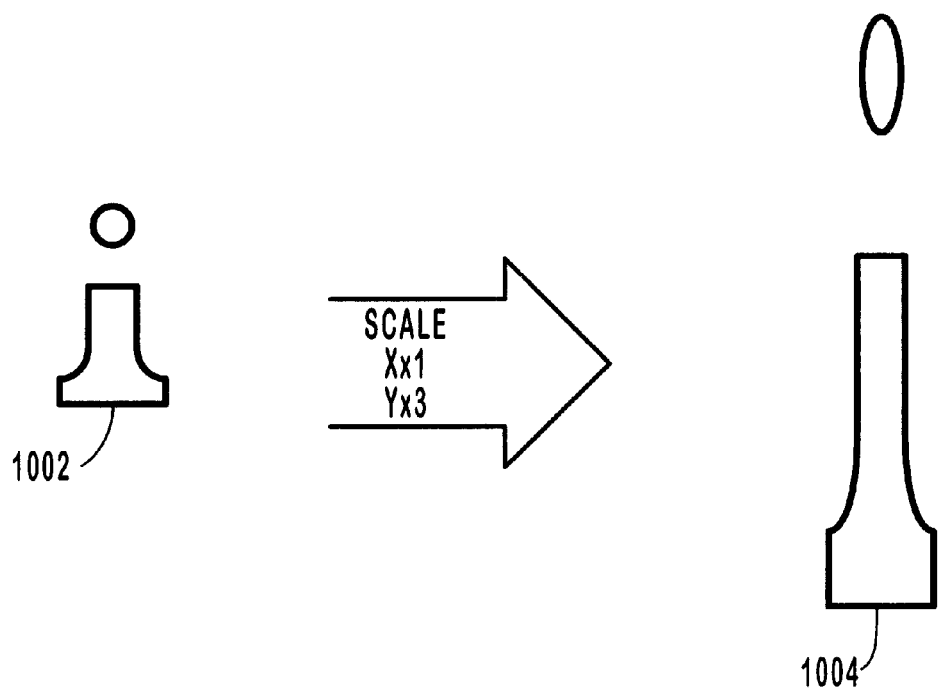
FIGS. 10A and 10B illustrate scaling operations performed in accordance with various exemplary embodiments of the present invention.

FIG. 10A illustrates a scaling operation performed on a high resolution representation of the letter i 1002 in anticipation of the display of the letter on a monitor with horizontal striping such as the one illustrated in FIG. 7A. Note that in this example scaling in the horizontal (x) direction is applied at a rate of x1 while scaling in the vertical (Y) direction is applied at a rate of x3. This results in a scaled character 1004 that is 3 times taller but just as wide as the original character 1002.

Figure 1:
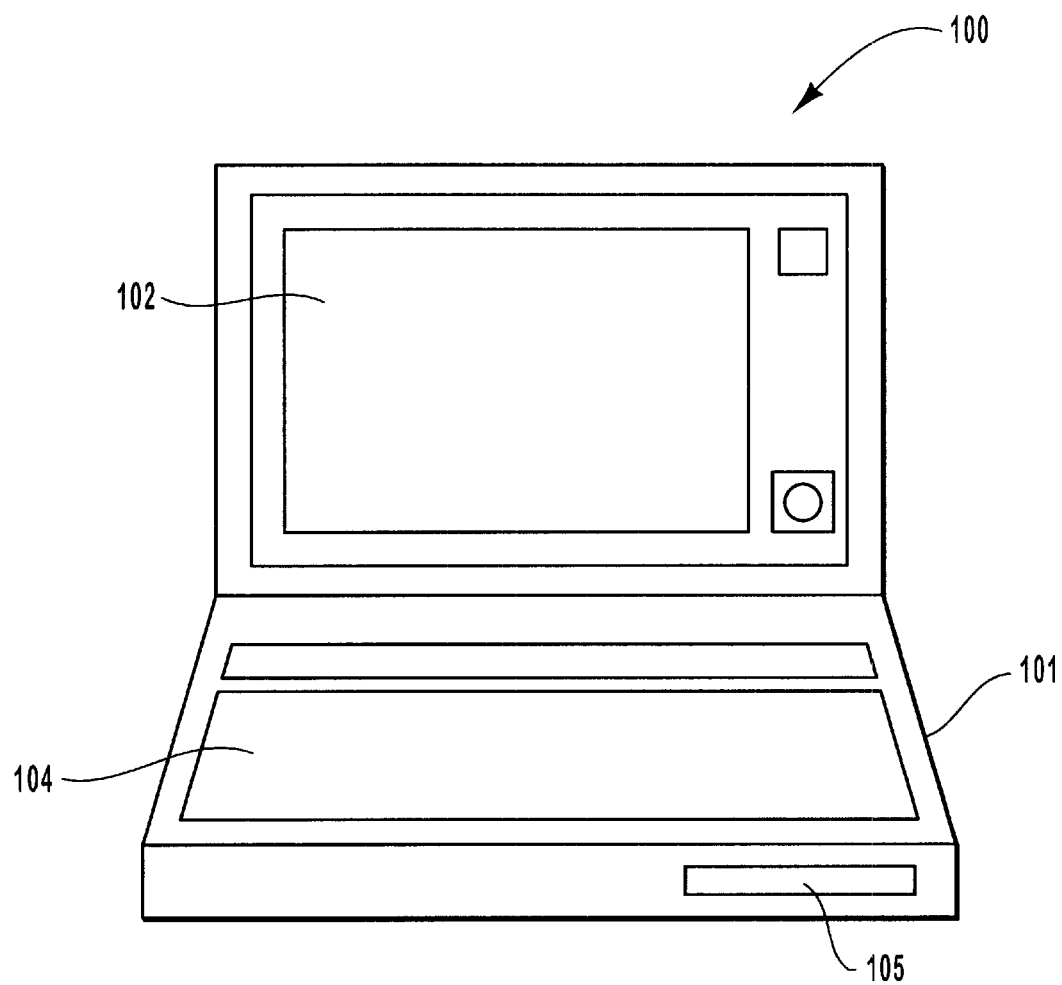
FIG. 1 is a diagram of a known portable computer.
Figure 2A:
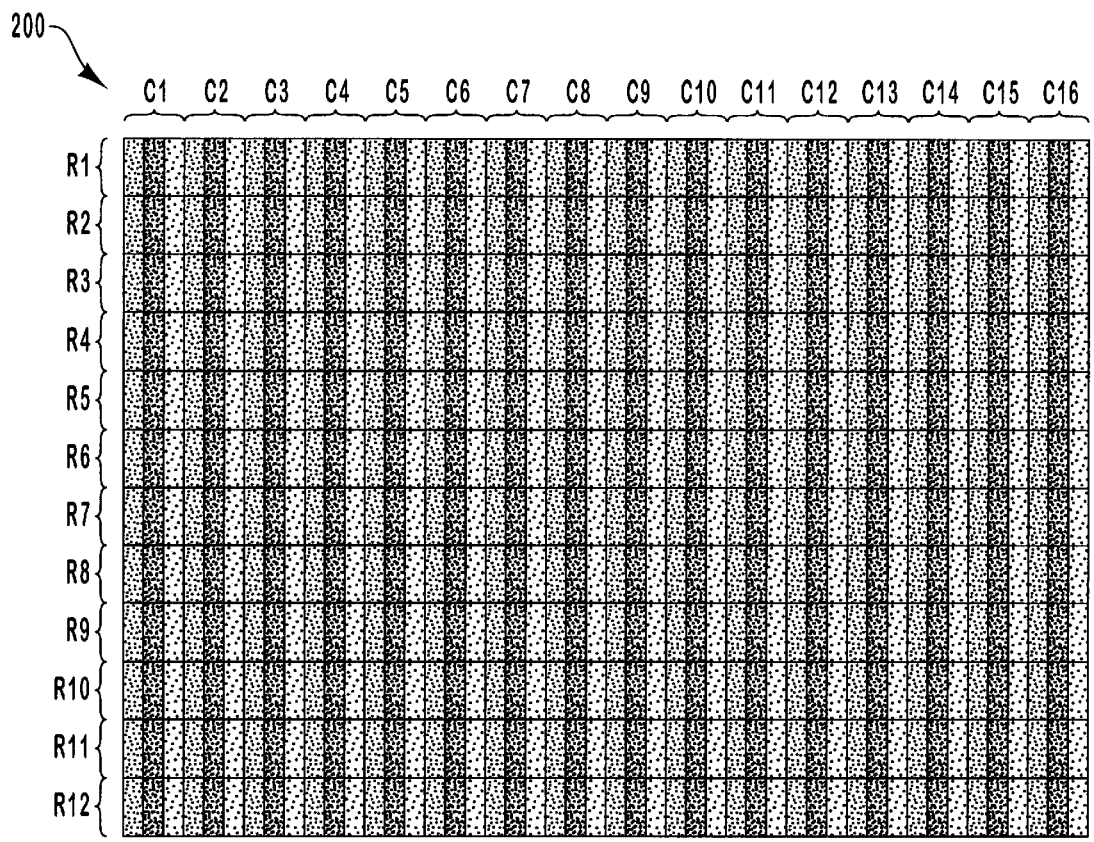
FIG. 2A illustrates a known LCD screen.
Figure 2B:
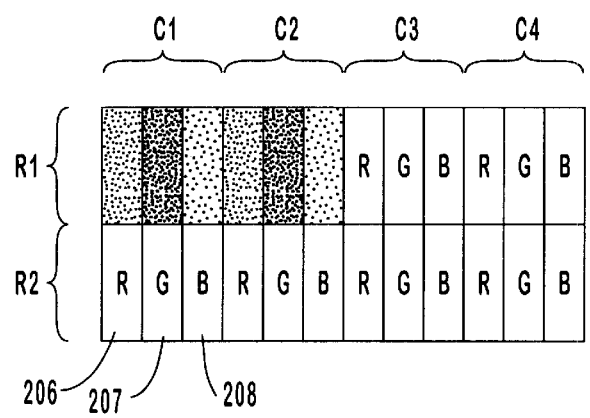
FIG. 2B illustrates a portion of the known screen illustrated in FIG. 2A in greater detail than the FIG. 2A illustration.
Figure 10B:
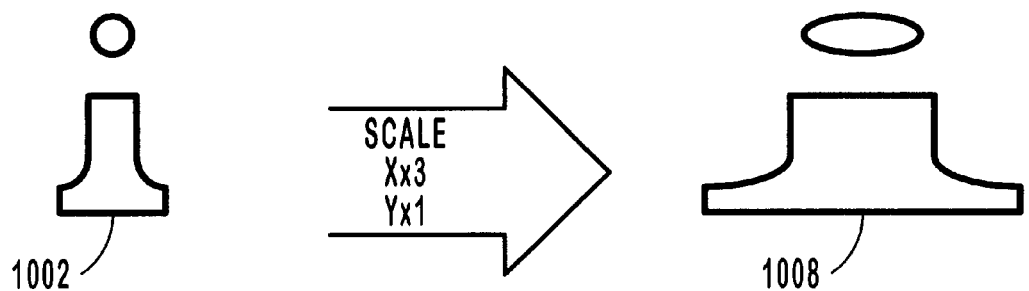

FIG. 10B illustrates a scaling operation performed on a high resolution representation of the letter i 1002 in anticipation of the display of the letter on a monitor with vertical striping such as the one illustrated in FIGS. 2A and 7C. Note that in this example scaling in the horizontal (X) direction is applied at a rate of x3 while scaling in the vertical (Y) direction is applied at a rate of x1. This results in a scaled character 1008 that is just as tall as the original character 1002 but three times wider.

Scaling by other amounts is possible. For example, in cases where a weighted scan conversion operation is to be used in determining luminous intensity values for pixel sub-components as part of a subsequent scan conversion operation, scaling is performed as a function of the RGB striping and weighting used. In one exemplary embodiment scaling in the direction perpendicular to the RGB striping is performed at a rate equal to the sum of the integer weights used during the scan conversion operation. In one particular embodiment, this results in scaling in the direction perpendicular to the striping at a rate of 10x while scaling is performed at a rate of 1x in the direction parallel to the striping.

Referring once again to FIG. 9A, once the scaling operation is completed in step 910, operation proceeds to step 912 in which hinting of the scaled image is performed, e.g., by executing the hinting sub-routine 810. The term grid-fitting is sometimes used to describe the hinting process.

Figure 11A:
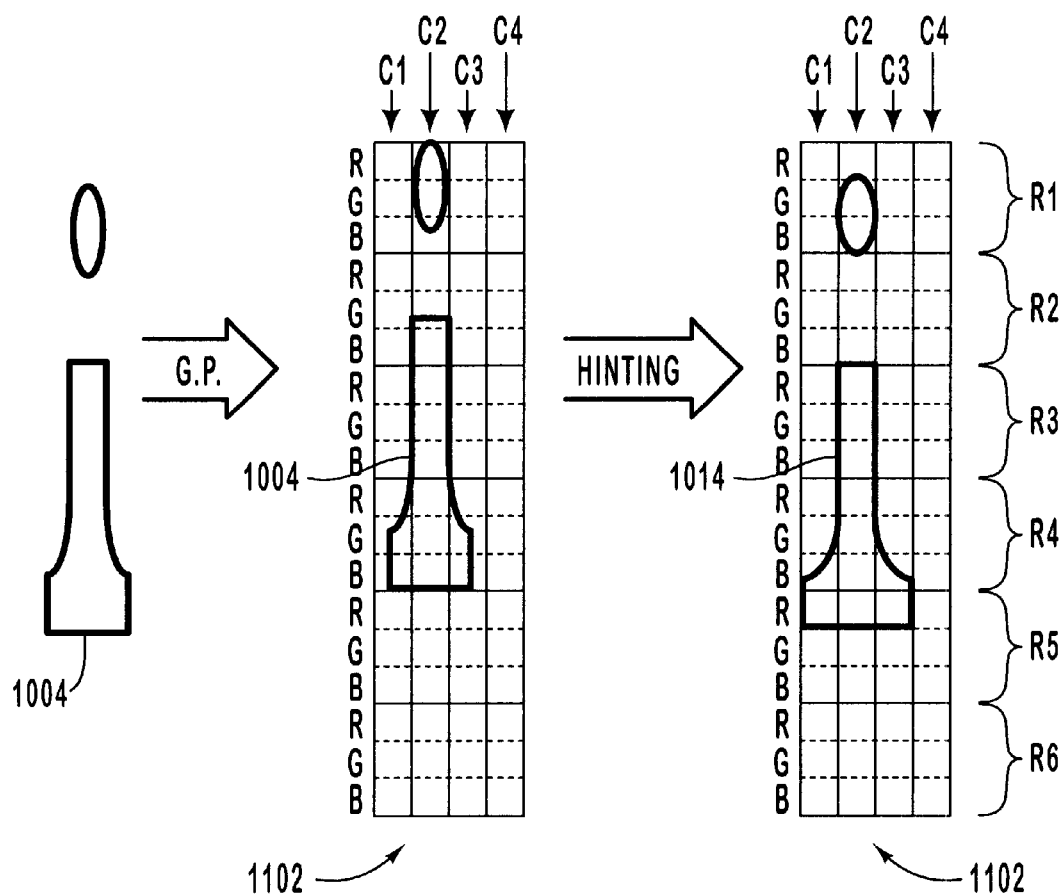
FIGS. 11A and 11B illustrate hinting operations performed in accordance with various exemplary embodiments of the present invention.
Figure 11B:
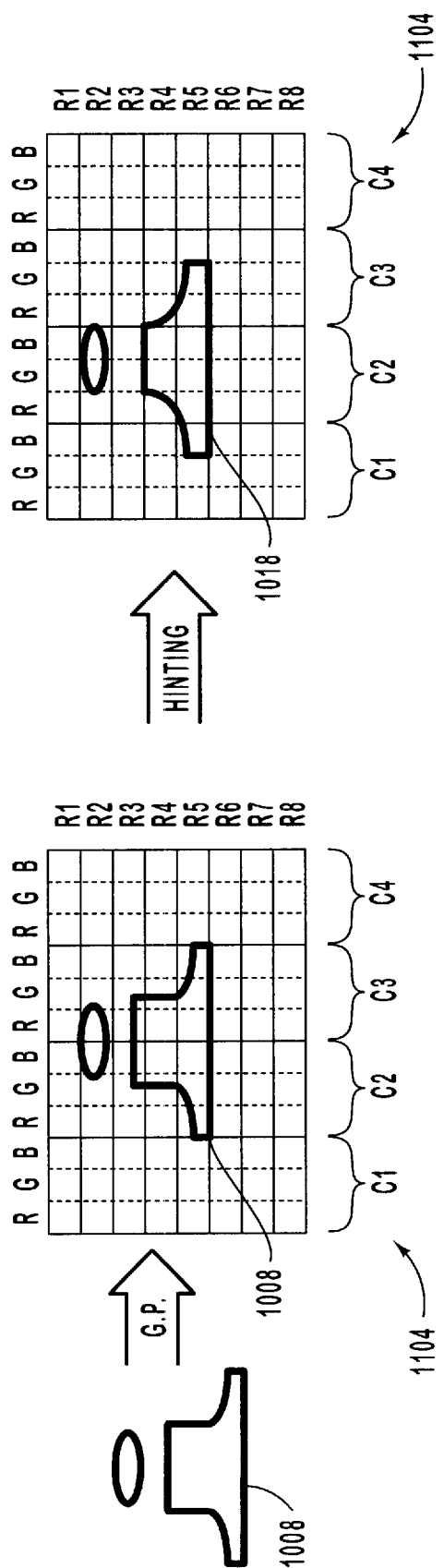

Hinting operations are illustrated in FIGS. 11A and 11B. FIG. 11A illustrates the hinting of the scaled character 1004 which is intended to be displayed on a monitor with horizontal striping. FIG. 11B illustrates the hinting of the scaled character 1008 which is intended to be displayed on a monitor with vertical striping.

Hinting involves the alignment of a scaled character, e.g., the character 1004, 1008 within a grid 1102, 1104 that is used as part of a subsequent scan conversion operation. It also involves the distorting of image outlines so that the image better conforms to the shape of the grid. The grid is determined as a function of the physical size of a display device's pixel elements.

Unlike the prior art which failed to take into consideration pixel sub-component boundaries during hinting, the present invention treats pixel sub-component boundaries as boundaries along which characters can and should be aligned or boundaries to which the outline of a character should be adjusted.

Hinting, implemented in accordance with the present invention as a function of pixel sub-component boundaries, can be used to reduce color distortions, e.g., color artifacts, that may be introduced as the result of treating each of the different color pixel sub-components as an independent luminous intensity source. In addition to the luminous intensity that is controlled, each pixel sub-component has a hue and a saturation that are normally constants determined by a color filter incorporated into the color display. When the luminous intensity of a sub-pixel is varied, the overall color of the pixel is also varied. To the extent that these color variations introduced by treating pixel sub-components as independent luminous sources, attract the attention of the human eye, they become artifacts that can distract from the function of the display which is to accurately recreate images for the human eye. It is desirable that artifacts that are likely to distract be avoided or minimized.

Adjusting the placement of an edge, e.g., as part of the hinting process, can have a significant effect in terms of reducing or eliminating color artifacts. For frequently used individual images, e.g., characters, edge placement information can be determined by a skilled typographer and stored in memory as part of the font information used for character generation. During the hinting operation, such specific character placement information, when available, is utilized to determine appropriate character placement during the hinting process. Images for which specific placement information is not stored may be aligned with various pixel and pixel sub-component boundaries according to stored, generally applicable hinting rules.

The hinting process of the present invention involves aligning the scaled representation of a character within the grid, e.g., along or within pixel and pixel sub-component boundaries in a manner intended to optimize the accurate display of the character using the available pixel sub-components. In many cases, this involves aligning the left edge of a character stem with a left pixel or pixel sub-component boundary and aligning the bottom of the character's base along a pixel component or sub-component boundary.

Experimental results have shown that in the case of vertical striping, characters with stems aligned so that the character stem has a blue or green left edge generally tend to be more legible than characters with stems aligned to have a red left edge. Accordingly, in at least some embodiments, during hinting of characters to be displayed on a screen with vertical striping, blue or green left edges for stems are favored over red left edges as part of the hinting process.

In the case of horizontal striping, characters aligned so that the bottom of the character base has a red or blue bottom edge generally tend to be more legible than characters with bases aligned to have a green bottom edge. Accordingly, during hinting of characters to be displayed on a screen with horizontal striping, in at least some embodiments, red or blue bottom edges are favored over green bottom edges as part of the hinting process.

FIG. 11A illustrates the application of a hinting operation to the scaled image 1104. As part of the hinting process, the scaled image 1104 is placed on a grid 1102 and its position and outline are adjusted to better conform to the grid shape and to achieve a desired degree of character spacing. The letters "G.P." in FIGS. 11A and 11B indicate the grid placement step while the term hinting is used to indicate the outline adjustment and character spacing portions of the hinting process.

Note that in FIG. 11A where the image 1004 is hinted for display on a screen having horizontal striping, the scaled image 1004 is positioned along the R/G pixel sub-component boundary so that the base of the character 1004 has a red bottom edge. In addition, the image's outline is adjusted so that rectangular portions of the image adjoin pixel sub-component boundaries. This results in the hinted image 1014. The distance between the character image and left and right side bearing points (not shown) used for determining character position and spacing on the screen are also adjusted as a function of pixel sub-component boundaries. Thus, in various embodiments of the present invention, character spacing is controlled to a distance corresponding to the width of a pixel sub-component, e.g., ⅓ of a pixel width.

In FIG. 11B where the image 1008 is hinted for display on a screen having vertical striping, the scaled image 1008 is positioned along the R/G pixel sub-component boundary so that the left edge of the stem of the hinted character 1018 has a green left edge. The shape of the character is also adjusted as well as the position of the character on the grid. Character spacing adjustments are also made.

Once the hinting process is completed in step 912, operation proceeds to step 914 wherein a scan conversion operation is performed in accordance with the present invention, e.g., by executing the scan conversion sub-routine 812.

Figure 2C:
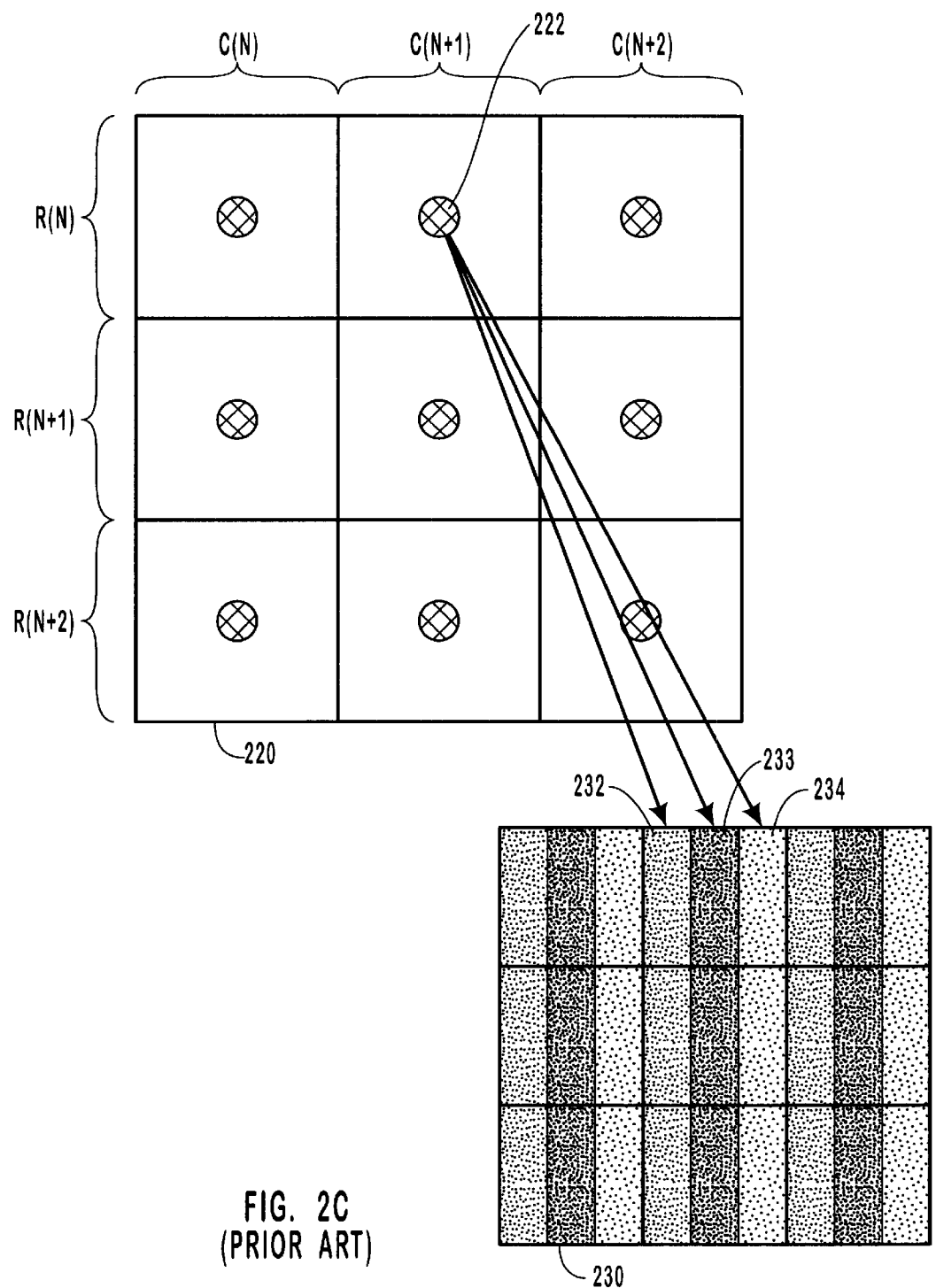
FIG. 2C illustrates an image sampling operation performed in known systems.

Scan conversion involves the conversion of the scaled geometry representing a character into a bitmap image. Conventional scan conversion operations treat pixels as individual units into which a corresponding portion of the scaled image can be mapped. Accordingly, in the case of conventional scan conversion operations, the same portion of an image is used to determine the luminous intensity values to be used with each of the RGB pixel sub-components of a pixel element into which a portion of the scaled image is mapped. FIG. 2C is exemplary of a known scan conversion process which involves sampling an image to be represented as a bitmap and generating luminous intensity values from the sampled values.

In accordance with the present invention, the RGB pixel sub-components of a pixel are treated as independent luminous intensity elements. Accordingly, each pixel sub-component is treated as a separate luminous intensity component into which a separate portion of the scaled image can be mapped. Thus, the present invention allows different portions of a scaled image to be mapped into different pixel sub-components providing for a higher degree of resolution than is possible with the known scan conversion techniques. That is, in various embodiments, different portions of the scaled image are used to independently determine the luminous intensity values to be used with each pixel sub-component.

Figure 6:
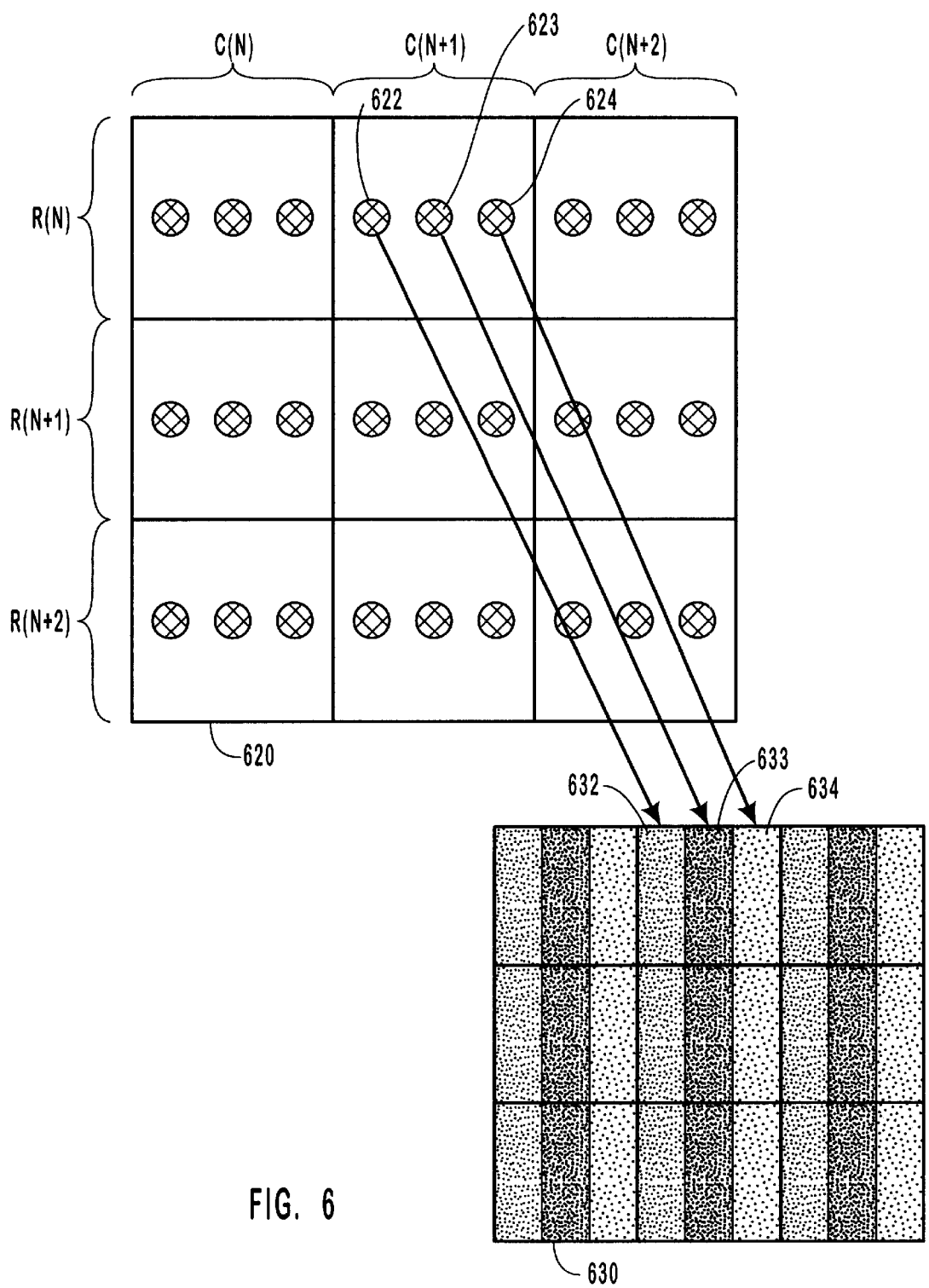
FIG. 6 illustrates image sampling performed in accordance with one exemplary embodiment of the present invention.

FIG. 6 illustrates an exemplary scan conversion implemented in accordance with one embodiment of the present invention. In the illustrated embodiment, separate image samples 622, 623, 624 of the image represented by the grid 620 are used to generate the red, green and blue intensity values associated with corresponding portions 632, 633, 634 of the bitmap image 630 being generated. In the FIG. 6 example, image samples for red and blue are displaced −⅓ and +⅓ of a pixel width in distance from the green sample, respectively. Thus, the displacement problem encountered with the known sampling/image representation method illustrated in FIG. 2C is avoided.

In the examples illustrated in the figures, white is used to indicate pixel sub-components which are "turned on" in the bitmap image generated by the scan conversion operation. Pixel sub-components which are not white are "turned off".

In the case of black text "on" implies that the intensity value associated with the pixel sub-component is controlled so that the pixel sub-component does not output light. Assuming a white background pixel, sub-components which are not "on" would be assigned intensity values which would cause them to output their full light output.

In the case where foreground and background colors are used "on" means that a pixel sub-component is assigned a value which would produce the specified foreground color if all three pixel sub-components were used to generate the foreground color. Pixel sub-components which are not "on" are assigned values which would produce the specified background color if all three pixel sub-components were used to generate the background color.

A first technique for determining if a pixel sub-component should be turned "on" during scaling is to determine if the center of the scaled image segment, represented by a portion of the scaling grid, being mapped into the pixel sub-component is within the scaled representation of the image to be displayed. For example, in FIG. 12A, when the center of grid segment 1202 was inside the image 1004, the pixel sub-component C1, R5 would be turned on. Another technique is to determine if 50% or more of the scaled image segment being mapped into the pixel sub-component is occupied by the image to be displayed. If it is, then the pixel sub-component is turned "on". For example, when the scaled image segment represented by grid segment 1202 is occupied at least 50% by the image 1004, then the corresponding pixel sub-component C1, R5 is turned on. In the FIGS. 12A, 12B, 13 and 14 examples which are discussed below, the first technique of determining when to turn a pixel sub-component on is employed.

Figure 12A:
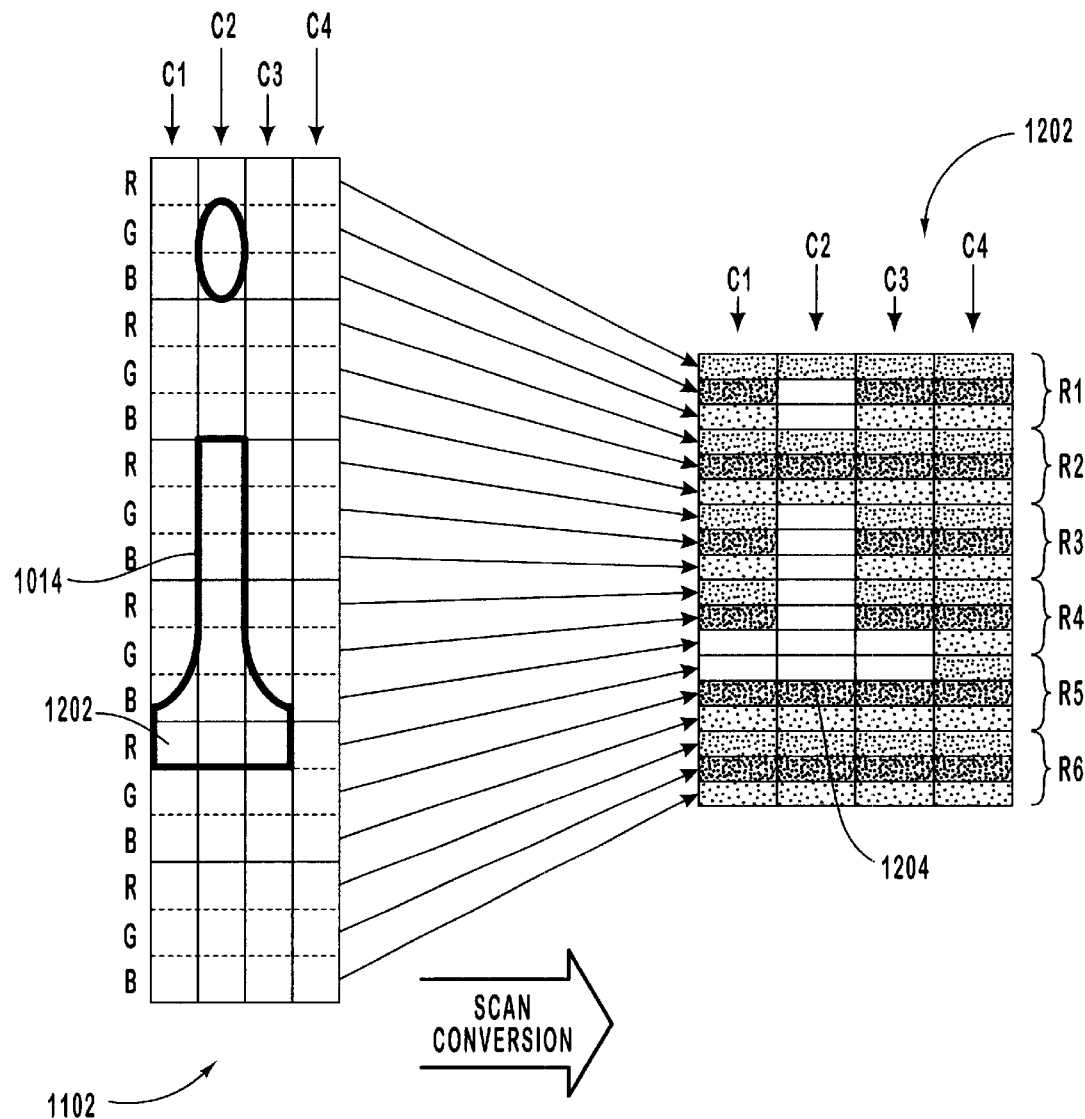
FIGS. 12A and 12B illustrate scan conversion operations performed in accordance with various exemplary embodiments of the present invention.

FIG. 12A illustrates a scan conversion operation performed on the hinted image 1014 for display on a display device with horizontal striping. The scan conversion operation results in the bitmap image 1202. Note how each pixel sub-component of bitmap image columns C1–C4 is determined from a different segment of the corresponding columns of the scaled hinted image 1014. Note also how the bitmap image 1204, comprises a ⅔ pixel height base aligned along a green/blue pixel boundary and a dot that is ⅔ of a pixel in height. Known text imaging techniques would have resulted in a less accurate image having a base a full pixel high and a dot which was a full pixel in size.

Figure 12B:
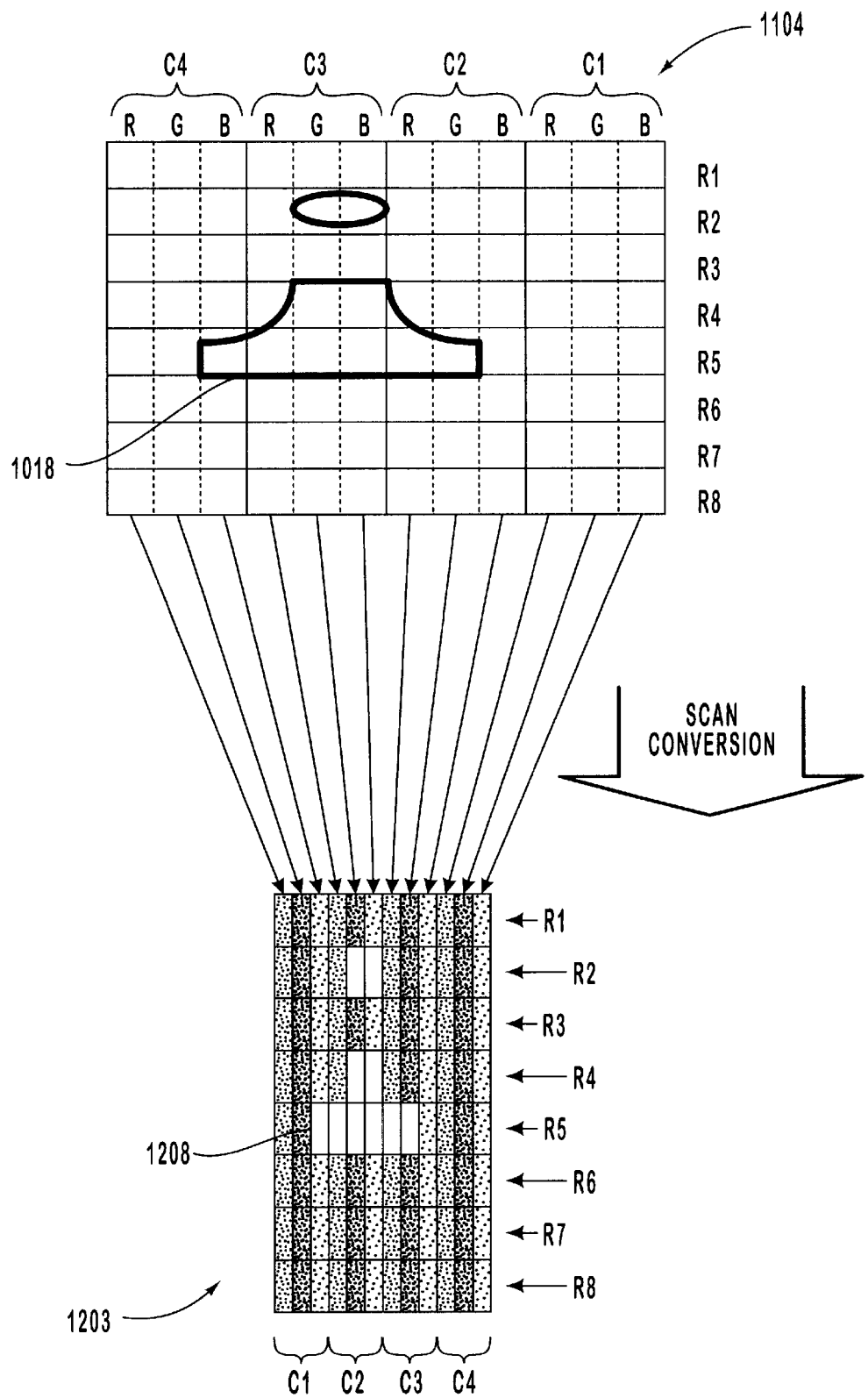

FIG. 12B illustrates a scan conversion operation performed on the hinted image 1018 for display on a display device with vertical striping. The scan conversion operation results in the bitmap image 1203. Note how each pixel sub-component of bitmap image columns R1–R8 is determined from a different segment of the corresponding rows of the scaled hinted image 1018. Note also how the bitmap image 1208, comprises a ⅔ pixel width stem with a left edge aligned along a red/green pixel boundary. Notice also that a dot that is ⅔ of a pixel in width is used. Known text imaging techniques would have resulted in a less accurate image having a stem a full pixel wide and a dot a full pixel in size.

Figure 13:
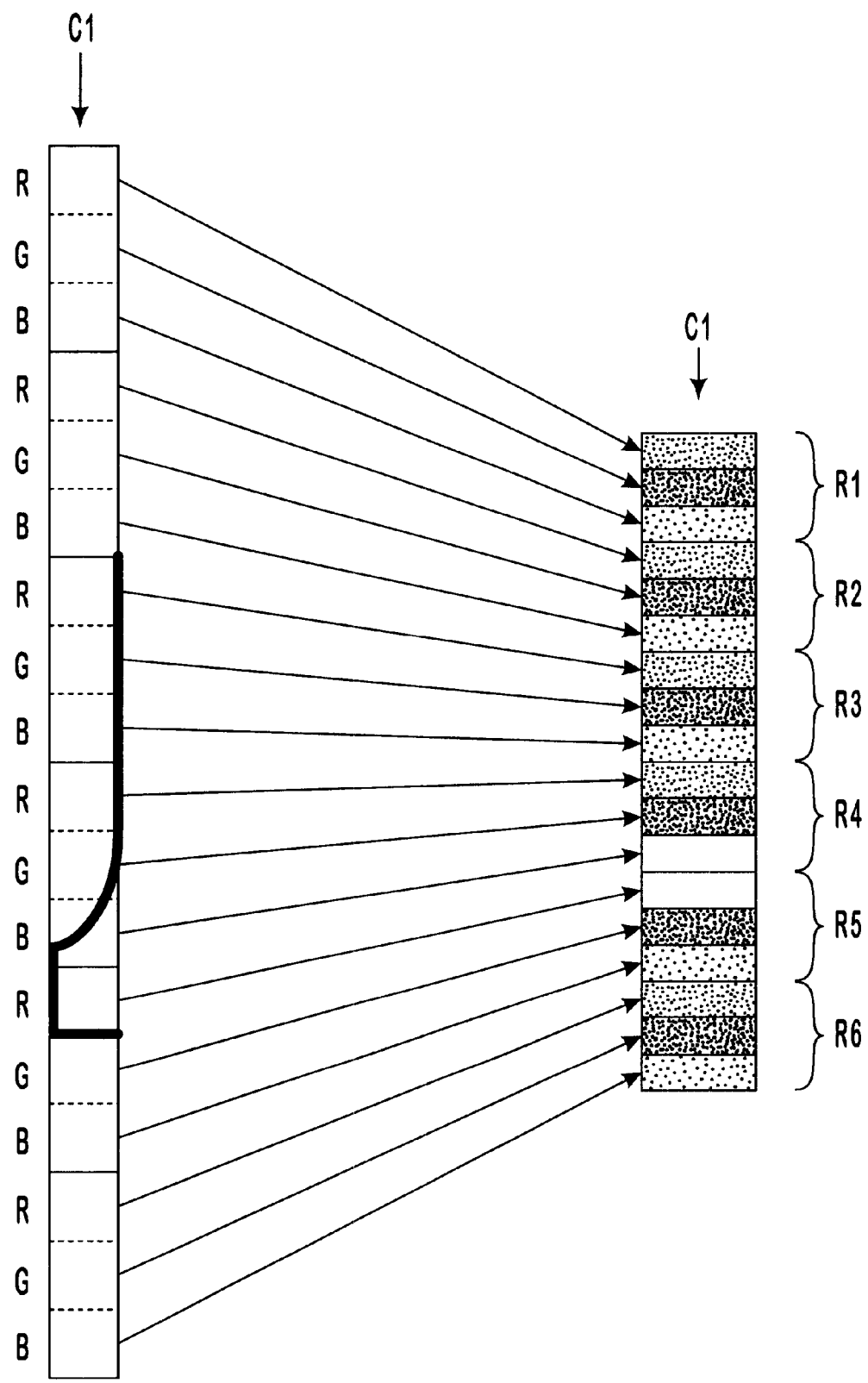
FIG. 13 illustrates the scan conversion process applied to the first column of image data illustrated in FIG. 12A in greater detail.

FIG. 13 illustrates the scan conversion processes performed to the first column of the scaled image 1014, shown in FIG. 12A, in greater detail. In the illustrated scan conversion process, one segment of the scaled image 1014 is used to control the luminous intensity value associated with each pixel sub-component. This results in each pixel sub-component being controlled by the same size portion of the scaled image 1014.

Weighting may be applied during the scan conversion operation. When weighting is applied, different size regions of the scaled image may be used to determine whether a particular pixel sub-component should be turned on or off or to a value in between (as in the case of gray scaling). Application of weighting in this manner represents an anti-aliasing filtering operation which is performed in the direction perpendicular to the direction of the RGB striping.

As discussed above, humans perceive light intensity from different color light sources at different rates. Green contributes approximately 60%, red approximately 30% and blue approximately 10% to the perceived luminance of a white pixel which results from having the red, green and blue pixel sub-components set to their maximum luminous intensity output.

In accordance with one embodiment of the present invention, weighting is used during scan conversion so that 60% of the scaled image area that is mapped into a pixel is used to determine the luminous intensity of the green pixel sub-component, a separate 30% of the scaled image area that is mapped into the same pixel is used to determine the luminous intensity of the red pixel sub-component, and a separate 10% of the scaled image area that is mapped into the same pixel is used to determine the luminous intensity of the blue pixel sub-component.

In one particular embodiment of the present invention, during the scaling operation, the image is scaled in the direction perpendicular to the striping at a rate which is ten times the rate of scaling in the direction of the striping. This is done to facilitate a weighted scan conversion operation. After hinting, the scaled image is then processed during scan conversion using a weighted scan conversion operation, e.g., of the type described above.

Figure 14:
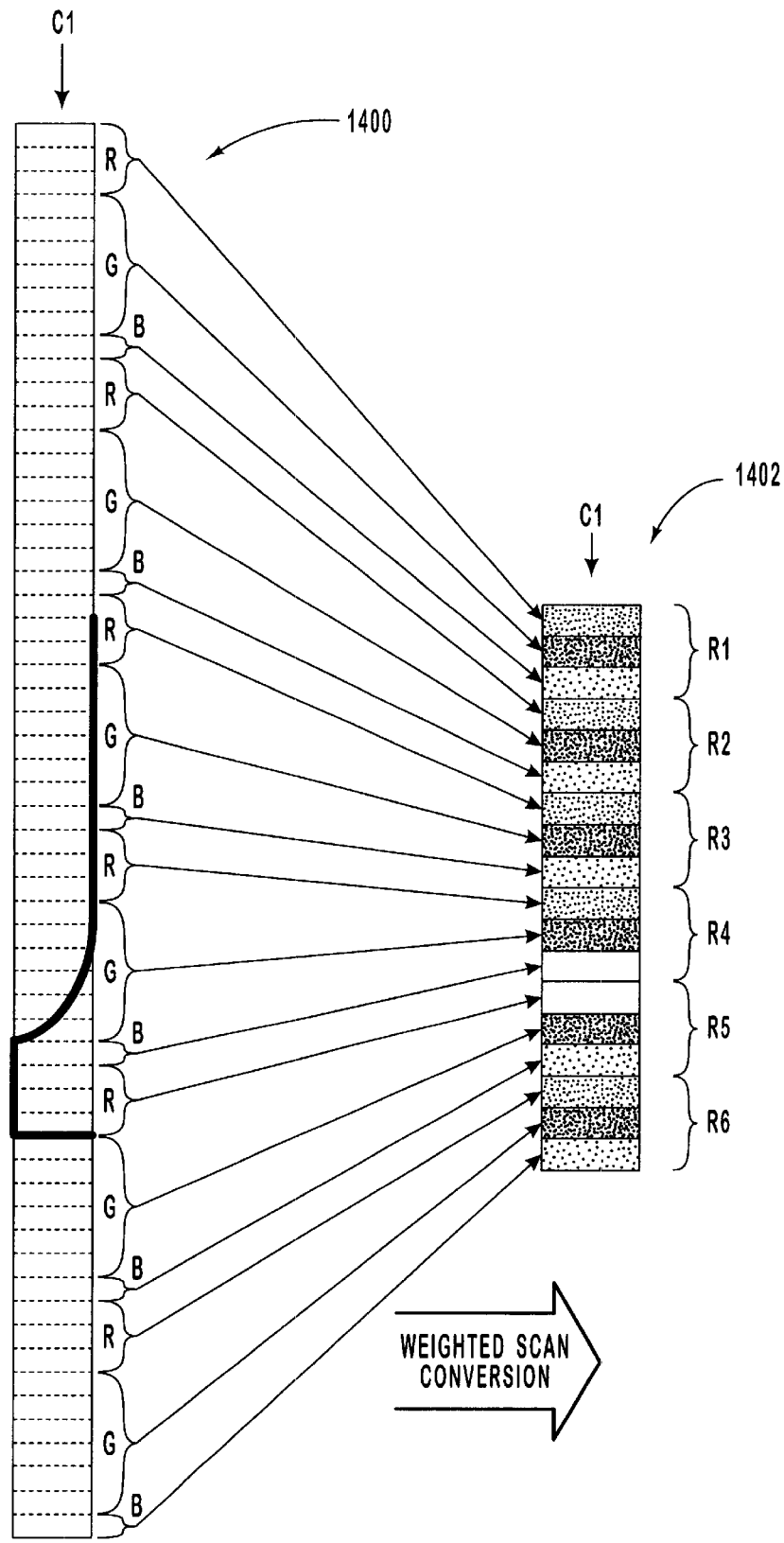
FIG. 14 illustrates a weighted scan conversion operation performed in accordance with one embodiment of the present invention.

FIG. 14 illustrates performing a weighted scan conversion operation on the first column 1400 of a scaled hinted version of the image 1002 which has been scaled by a factor of 10 in the vertical direction and a factor of one in the horizontal direction. In FIG. 14, the portion of the hinted image which corresponds to a single pixel comprises 10 segments. In accordance with the weighted scaling technique discussed above, the first three segments of each pixel area of the scaled image are used to determine the luminous intensity value of a red pixel sub-component corresponding to a pixel in the bitmap image 1402. The next six segments of each pixel area of the scaled image 1400 are used to determine the luminous intensity value of a green pixel sub-component corresponding to the same pixel in the bitmap image 1402. This leaves the last segment of each pixel area of the scaled image 1400 for use in determining the luminous intensity value of the blue pixel sub-component.

As illustrated in FIG. 14, this process results in the blue pixel sub-component being turned "on" in column 1, row 4 and the red pixel sub-component being turned "on" in column 1, row 5, of the bitmap image 1402 with the remaining pixel sub-components of column 1 being turned "off".

Generally, the scan conversion process of the present invention has been described in terms of turning a pixel sub-component "on" or "off".

Various embodiments of the present invention, particularly well suited for use with, e.g., graphics images, involve the use of gray scale techniques. In such embodiments, as with the embodiments discussed above, the scan conversion operation involves independently mapping portions of the scaled hinted image into corresponding pixel sub-components to form a bitmap image. However, in gray scale embodiments, the intensity value assigned to a pixel sub-component is determined as a function of the portion of the scaled image area being mapped into the pixel sub-component that is occupied by the scaled image to be displayed. For example, if, a pixel sub-component can be assigned an intensity value between 0 and 255, 0 being effectively off and 255 being full intensity, a scaled image segment (grid segment) that was 50% occupied by the image to be displayed would result in a pixel sub-component being assigned an intensity value of 128 as a result of mapping the scaled image segment into a corresponding pixel sub-component. In accordance with the present invention, the neighboring pixel sub-component of the same pixel would then have its intensity value independently determined as a function of another portion, e.g., segment, of the scaled image.

Once the bitmap representation of the text to be displayed is generated in step 914 of FIG. 9A it may be output to the display adapter or processed further to perform color processing operations and/or color adjustments to enhance image quality.

While humans are much more sensitive to luminance edges as opposed to image color (chrominance) edges, treating the RGB pixel sub-components as independent luminous intensity elements for purposes of image rendering can result in undesired color fringing effects. If, for instance, you remove red from an RGB set, a color fringing effect of cyan, the additive of green and blue, is likely to result.

As discussed above, color artifacts may result from treating the different color pixel sub-components of a pixel as independent luminous intensity sources. Some of these color artifacts may remain after hinting. In fact, hints that improve the color of one edge of an image may degrade the color of another edge within the same image, e.g., character.

It is desirable that color artifacts which distract, e.g., attract the attention of the human eye to an undesirable degree, be detected and suppressed to a degree that they no longer distract. Since color sensitivity varies dramatically from person to person color artifacts which may be distracting to one person may not be distracting to another. Accordingly, from an implementation standpoint, it is useful to focus on suppressing or eliminating color artifacts which are likely to distract a large percentage of the population. Empirical studies conducted by various named inventors of the present application have indicated that color artifacts which are most likely to be noticed are those which 1) are bright and 2) differ substantially in hue from the foreground color, the background color, and the colors that can be created by mixing the two.

As will be discussed below, adjusting the luminous intensity of pixel sub-components of distracting pixels may involve (1) subtracting some luminous intensity from bright pixel sub-components and/or (2) adding some luminous intensity, e.g., the amount that was subtracted in (1), to an adjacent, different colored pixel sub-component, e.g., a neighboring pixel sub-component of the same pixel. Performing steps (1) and/or (2) in accordance with the color compensation techniques of the present invention reduces color artifacts and thus color distractions. However, such color processing may have the unwanted side effect of degrading a desired image edge. However, in most cases it has been found that it is possible to reduce color artifacts to a level where they no longer distract and still provide improved image quality as compared to the known approach where pixel sub-components are not treated as independent luminous intensity sources.

In the FIG. 9A embodiment, the bitmap generated in step 914 is supplied to the color processing/adjustment step 915. In this step, image processing is performed to reduce and/or eliminate distracting color artifacts resulting from treating the pixel sub-components as independent luminous intensity sources. Various techniques may be used to identify, reduce and/or eliminate distracting color artifacts.

In one specific embodiment, portions of an image are examined to determine how far away from the desired foreground color the bitmap image has strayed. If portions of the bitmap image have strayed more than a pre-selected amount from the desired foreground color, adjustments in the intensity values of pixel sub-components are applied until the image portions are brought within an acceptable range of an average between the foreground and background colors.

In one particular embodiment, where vertical striping is used, image edges are checked for red fringing effects. These result from the red luminous intensity value of a pixel element being much higher than the green luminous intensity value for the same pixel element. Such a condition can produce a noticeable red color fringing effect on vertical stems of characters. In the exemplary embodiment, image edge pixels are individually examined. A red/green difference intensity value is determined and compared to a threshold value which is used to determine the need for a color adjustment. If the determined red/green difference intensity exceeds the threshold value, the red and/or green values are scaled to reduce the red fringing effect. Appropriate threshold and scaling values can be empirically determined.

Cyan color fringing effects, resulting from a low red luminous intensity value compared to the green and blue luminous intensity values may be detected and compensated for by using similar thresholding and luminous intensity scaling techniques to those discussed above with regard to compensating for red fringing effects.

Figure 9B:
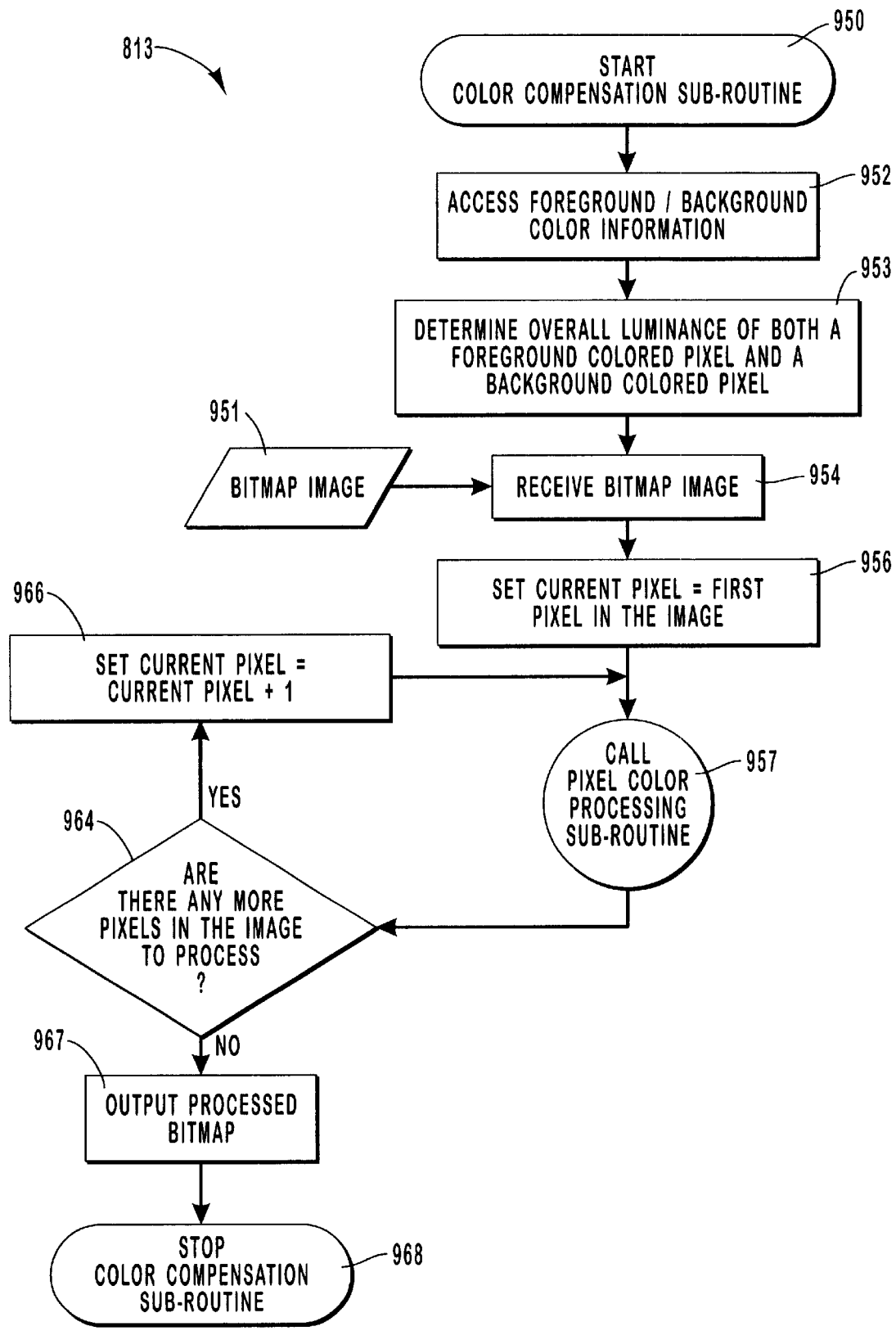
FIG. 9B illustrates an exemplary color compensation sub-routine 813 of the present invention which may be used to implement the color processing/adjustment performed in step 915 of FIG. 9A.
Figure 9C:
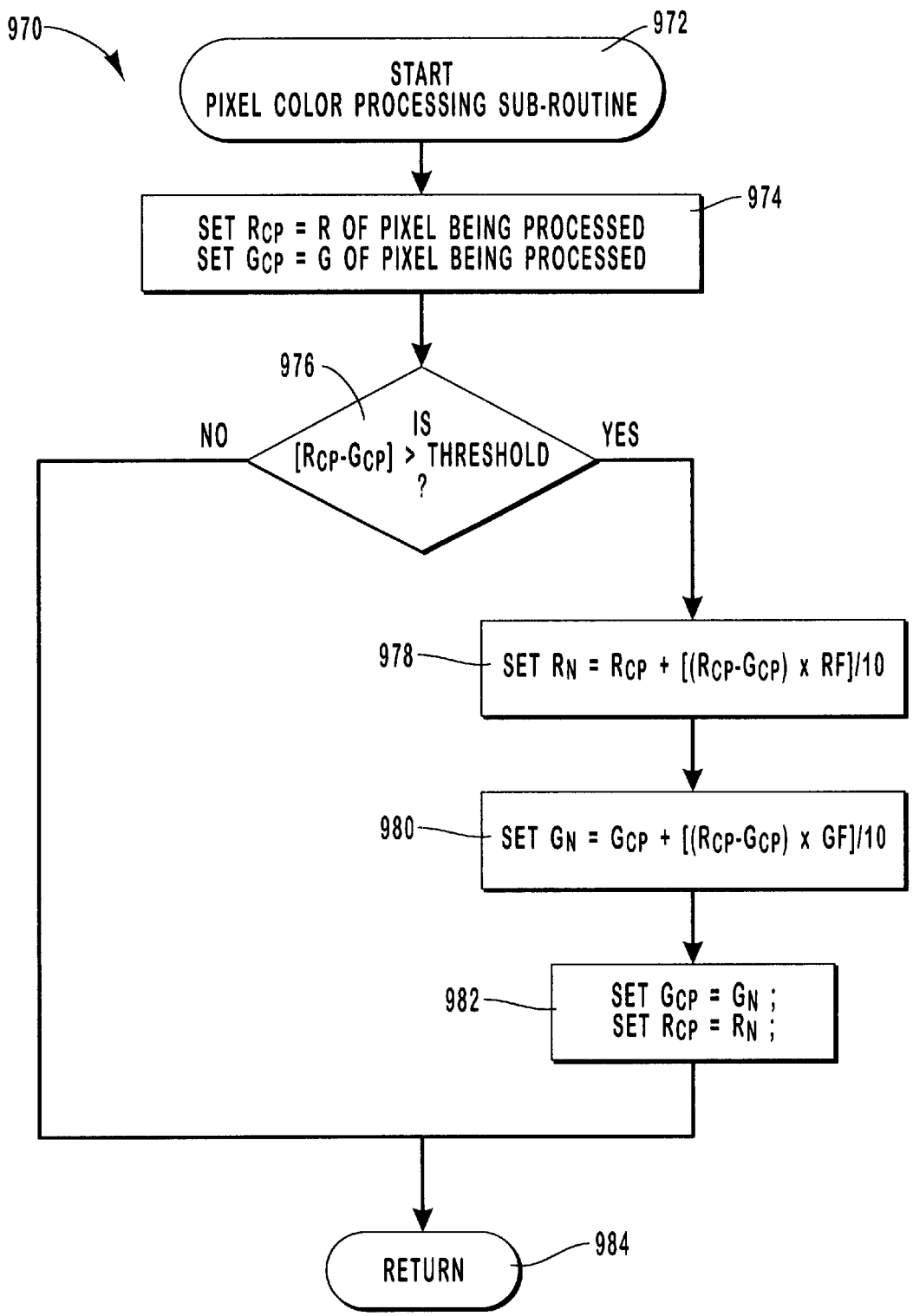
FIGS. 9C and 9D illustrate pixel color processing sub-routines implemented in accordance with exemplary embodiments of the present invention.
Figure 9D:
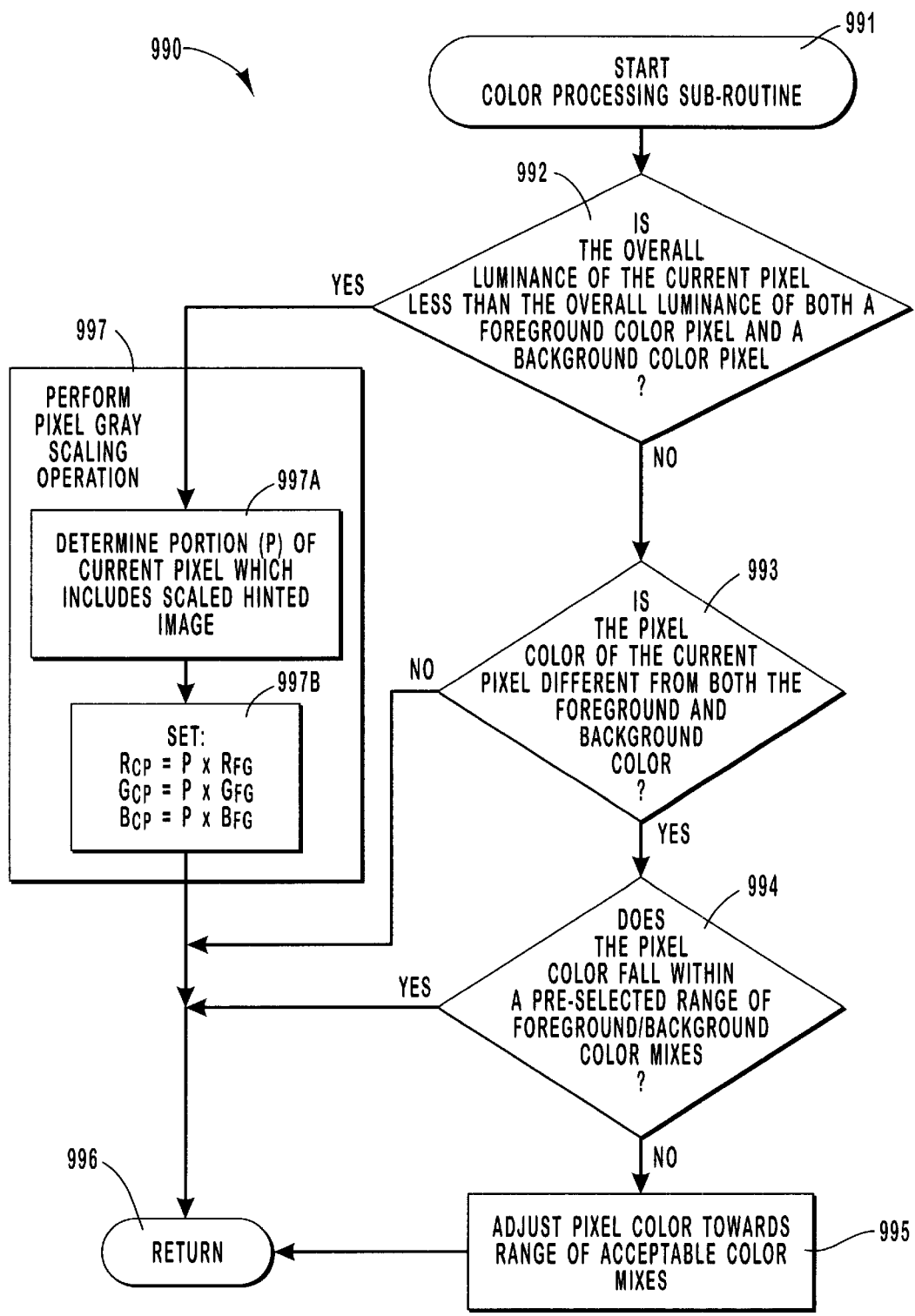

FIG. 9B illustrates an exemplary color compensation sub-routine 813 that is used, in various exemplary embodiments in conjunction with a pixel color processing sub-routine, e.g., the sub-routine 970 of FIG. 9C or the sub-routine 990 of FIG. 9D, to perform the color processing/adjustment operation of step 915.

Color processing and adjustment is performed, as required, by the sub-routine 813 on a per pixel processing basis. The sub-routine 813 starts in step 950 wherein the sub-routine is executed by the CPU 521. From step 950 operation proceeds to step 952 wherein information identifying the foreground and background colors to be used, e.g., for text rendering, are accessed. This may involve accessing color information stored by the operating system in, e.g., the memory 535.

In the next step, step 953, the overall luminous intensity of both a foreground colored pixel and a background colored pixel is determined. In one embodiment, for both the foreground and background colored pixels, this involves summing the red luminance value multiplied by a weighting factor of 0.3, the green luminance value by a weighting factor of 0.6, and the blue luminance value by a weighting factor of 0.1 as follows:

$$\text{overall luminous intensity of a pixel} = 0.3R + 0.6G + 0.1B,$$

where R, G and B are the luminance intensity values of the corresponding pixel whose overall luminous intensity is being determined. The determined overall luminous intensity values of the background and the foreground colored pixels are used, at least in one embodiment, by a pixel color processing sub-routine as will be discussed below.

In step 954, the bitmap image 951, e.g., the bitmap image previously generated in step 914, is received for processing. The bitmap image 951 comprises a total of N pixels, i.e., pixel 1 to pixel N.

From step 954 operation proceeds to step 956 wherein the CURRENT PIXEL is set equal to the first of the N image pixels. The label CURRENT PIXEL indicates which one of the N pixels of image 951 is being processed at any given time.

Operation proceeds from step 956 to step 957 where a call is made to a pixel color processing sub-routine, e.g., either the sub-routine 970 of FIG. 9C or the sub-routine 990 of FIG. 9D.

The pixel color processing sub-routines 970, 990 will be discussed in detail below with regard to FIGS. 9C and 9D. Generally, the called pixel color processing sub-routine is responsible for determining if the luminous intensity values of the CURRENT PIXEL should be adjusted to reduce or eliminate color artifacts and to make such adjustments as required. If the pixel color processing sub-routine determines that no changes are to be made to the luminance intensity values of the CURRENT PIXEL's pixel sub-components, operation proceeds to step 964 via a return from the called sub-routine, with the luminance intensity values of the CURRENT PIXEL's pixel sub-components unaltered. However, if the called sub-routine determines that one or more of the luminance intensity values of the CURRENT PIXEL's pixel sub-components should be changed to reduce or eliminate distracting color distortions, e.g., artifacts, one or more of the luminance intensity values of the CURRENT PIXEL's pixel sub-components return from the sub-routine with an adjusted value.

The remaining steps of the color compensation sub-routine serve to insure that each of the N pixels in the received bitmap image are processed by one of the pixel color processing sub-routines 970, 990.

With each return from a call to the pixel color processing sub-routine in 957, operation proceeds to step 964 where a determination is made as to whether or not there are any more pixels in the received image to process. This may be determined by determining if the CURRENT PIXEL is the Nth pixel. If, in step 964 it is determined that additional pixels still need to be processed, operation proceeds to step 966 wherein the CURRENT PIXEL is set equal to the next one of the N pixels. From step 966 operation proceeds once again to step 957 wherein the pixel color processing sub-routine is called once again.

If, however, in step 964 it is determined that all the pixels of the received image have been processed, operation proceeds to step 967 wherein the processed bitmap is output by the color compensation sub-routine. The processed bitmap includes the luminance intensity values which were modified by the calls to the pixel color processing sub-routine.

With the output of the processed bitmap, operation of the color compensation sub-routine 813 is stopped in step 968 pending the restarting of the sub-routine, e.g., to process another bitmapped image 951.

The first pixel color processing sub-routine 970 works particularly well with black and white images, e.g., black text on a white background. The sub-routine 970 does not use the overall luminous intensity values of foreground and background colored pixels. Accordingly, step 953 of the color compensation sub-routine can be omitted or skipped when using the pixel color processing sub-routine 957.

White is the sum of all three pixel color components, e.g., red, green and blue. Bright color artifacts, in a black on white embodiment, are those colors which result from summing the full light output of any two of the three pixel color components, e.g., yellow is the sum of red and green, magenta is the sum of red and blue, and cyan is the sum of green and blue. Because the blue sub-pixel has only ⅓ the potential luminous intensity of the red, and only ⅙$^{th}$ that of the green pixel sub-components, a blue pixel sub-component has little effect in trading luminous intensity with a bright red or green pixel sub-component. For this reason, in the exemplary 9C embodiment, potential artifacts resulting from blue various intensity values are ignored.

The processing implemented in sub-routine 970 serves to identify pixels which are likely to distract as those for which one of the red or green pixel sub-components are bright and the other is not. Suppression of the color artifact is achieved in the sub-routine 970 by decreasing the luminance intensity value of the brighter of the red or green pixel sub-components and increasing the luminance intensity value of the dimmer of the red or green pixel sub-components.

The processing performed on the R, G and B luminous intensity values of a CURRENT PIXEL, performed by sub-routine 970, may be expressed in pseudo code as follows:

If $|R_{CP}-G_{CP}|$>THRESHOLD THEN:
SET $R_N=R_{CP}+[(R_{CP}-G_{CP})\times RF]/10$
$G_N=G_{CP}+[(R_{CP}-G_{CP})\times GF]/10$
where
$R_{CP}$=luminance intensity value of the CURRENT PIXEL's red pixel sub-component which can be any integer value in the range of 0 to 255;
$G_{CP}$=luminance intensity value of the CURRENT PIXEL's red pixel sub-component which can be any integer value in the range of 0 to 255;
$R_N$=luminance intensity value of the CURRENT PIXEL's red pixel sub-component which can be any integer value in the range of 0 to 255;
$G_N$=luminance intensity value of the CURRENT PIXEL's green pixel sub-component which can be any integer value in the range of 0 to 255;
$R_F$ is a red factor, e.g., 4;
$G_F$ is a green factor, e.g., 6; and
THRESHOLD is an empirically determined threshold value, e.g., 50.

Referring now to FIG. 9C it can be seen that the pixel color processing sub-routine 970 begins with start step 972 wherein the routine is called for processing the CURRENT PIXEL's red and green luminance intensity values which can be any integer value in the range of 0 to 255, respectively. Next, in step 974 the value $R_{CP}$ is set equal to the red pixel sub-component luminous intensity value of the pixel being processed and $G_{CP}$ is set equal to the green pixel sub-component luminous intensity value of the pixel being processed. Then, in step 976, a determination is made as to whether $|R_{CP}-G_{CP}|$ is greater than a predetermined threshold value, THRESHOLD, used to determine the presence of a distracting color artifact.

If the threshold value is not exceeded in step 976, indicating that a distracting color artifact probably does not exist, processing returns, via RETURN step 984, to the place from which the sub-routine 970 was called without alteration of the CURRENT PIXEL's luminance values.

If, however, it is determined that the value $|R_{CP}-G_{CP}|$ exceeds the value THRESHOLD, indicating the probable presence of a distracting color artifact, operation proceeds from step 976 to step 978. In step 978 a new red pixel sub-component luminance intensity value RN is generated as a function of the original red and green intensity values. In particular, $R_N$ is set equal to $R_{CP}+[(R_{CP}-G_{CP})\times RF/10]$. Division by ten is performed to avoid the need to use a floating point value for RF which would then necessitate the use of floating point arithmetic.

Next, in step 980, a new green pixel sub-component luminance intensity value $G_N$ is generated as a function of the original red and green intensity values. In particular, $G_N$ is set equal to $G_{CP}+[(R_{CP}-G_{CP})\times RF/10]$. As in the case of generation of the value $R_N$, division by ten is performed to avoid the need to use a floating point value for RF which would require floating point arithmetic to be performed.

While steps 978 and 980 are shown in series, it is to be understood that they could be performed in parallel. After generation of the new values $R_N$ and $G_N$, the corresponding red and green luminance intensity values of the current pixel are replaced with the newly generated values. This occurs in step 982. With the CURRENT PIXEL's red and green luminance intensity values updated in step 982, color correction processing with regard to the current pixel is complete and processing returns, via RETURN step 984, to the place from which the sub-routine 970 was called.

Operation of the second exemplary pixel color processing sub-routine 990 will now be described in regard to FIG. 9D. The sub-routine 990 is suitable for processing pixels of images which are to be displayed using arbitrary, e.g., user selected, foreground and background colors.

With arbitrary foreground and background colors, the identification and suppression of color artifacts resulting from treating individual pixel sub-components as independent luminous intensity sources becomes more difficult than the black and white case discussed above. Experiments have shown that the more saturated the foreground or background color, the less likely it is that a color artifact will be distracting. This is because saturation is actually achieved by suppressing the brightness of the complementary color components. This limited brightness of the complementary color components not only avoids the creation of bright distracting color artifacts, but makes the suppressed pixel sub-component's unsuitable for creating an edge with a high luminous intensity on the suppressed pixel sub-component's side. The net result is that for highly-saturated colors, many of the possible edge containing pixels gain no improvement in resolution from treating pixel sub-components as independent luminous intensity sources in accordance with the present invention. An example of a foreground/background color combination which can be problematic in the above described manner is red text on a blue background.

On a display that places red pixel sub-components on the left and blue pixel sub-components on the right, a pixel rendered to display an edge with blue on the left and red on the right would be entirely black. Such a pixel would not have a color artifact, but also would make no contribution to the resolution of the image. In fact, a row of such pixels could even create the appearance of a black line, an artifact of the sub-pixel intensity control technique of the present invention. From an image quality standpoint, it is desirable that such artifacts be identified and eliminated, e.g., by utilizing traditional, whole pixel rendering techniques such as gray scaling with regard to pixels that would otherwise produce such artifacts.

The color processing sub-routine 990 includes steps directed to identifying pixels which produce artifacts of the above described type which would benefit from the application of gray scaling on a whole pixel level as opposed to the generation independent luminance values for each of the pixel sub-components. It also includes steps which involve the application of gray scaling to determine the luminance values for such pixels. In one embodiment, the gray scaling reversion is applied whenever the overall luminance intensity of the pixel being processed is less than the overall luminance intensity of both the foreground and background color.

In addition to determining when gray scaling would enhance pixel appearance, the color processing sub-routine 990 is directed to identifying distracting color artifacts and performing processing to reduce or eliminate such artifacts.

The pixel color processing sub-routine 990 begins in the start step 991 and proceeds from there to step 992 where a determination is made as to whether or not gray scaling, applied on a whole pixel basis, should be used to determine the luminance values of the CURRENT PIXEL. In step 992 a determination is made as to whether or not the overall luminance of the CURRENT PIXEL is less than the overall luminance of both a foreground color pixel and a background color pixel. If it is determined that the overall luminance value is less then that of a foreground and a background color pixel, than gray scaling will probably provide superior luminance values than those determined by the pixel sub-component method of the present invention. In such a case, operation proceeds from step 992 to step 997 wherein a pixel gray scaling operation is performed. The gray scaling operation involves two sub-steps, 997A and 997B. In step 997A the portion (P) of the current pixel which includes the scaled hinted image is determined. In step 997B, new red, green and blue luminance intensity values are determined for the current pixel by multiplying the fractional value P times the corresponding R, G and B luminance intensity values of the foreground color. Once the updated luminance intensity values for the CURRENT PIXEL are generated in step 997, processing returns, via RETURN step 984, to the place from which the sub-routine 970 was called.

If in step 992 it was determined that gray scaling was not likely to improve the quality of the CURRENT PIXEL, operation proceeds to step 993. In step 993, a determination is made as to whether the color of the CURRENT PIXEL is different from both the foreground and background colors. This determination may be made by comparing the R, G, and B luminance intensity values of the CURRENT PIXEL to those of a foreground color pixel and a background color pixel. If in step 993 it is determined the color of the current pixel matches one of the foreground and background color pixels, no color artifact is present and processing returns, via RETURN step 984, to the place from which the sub-routine 970 was called with the CURRENT PIXEL's luminance intensity values being left unaltered.

If, however, in step 993 it is determined that the color of the current pixel differs from the foreground and background colors, operation proceeds to step 994. In step 994 a determination is made as to whether or not the color of the CURRENT PIXEL falls within a pre-selected acceptable range of colors corresponding to foreground/background color mixes. If the color of the current pixel falls within the pre-selected range, processing returns, via RETURN step 984, to the place from which the sub-routine 970 was called with the CURRENT PIXEL's luminance intensity values being left unaltered.

However, if in step 994 it is determined that the color of the CURRENT PIXEL falls outside the pre-selected range of acceptable colors, indicating the presence of a distracting color artifact, operation proceeds to step 995 wherein the color of the CURRENT PIXEL is adjusted towards the range of acceptable colors. This may involve modifying one or more of the R, G, B luminance intensity values associated with the CURRENT PIXEL, e.g., by adding or subtracting from the existing values to move the individual value closer to those found in the pre-selected range of acceptable colors. Thus, at the end of step 995, the color of the CURRENT PIXEL is closer to being within, or falls within, the pre-selected acceptable range of colors corresponding to a mix of foreground and background colors. Once the luminance intensity values of the CURRENT PIXEL are updated in step 995, processing returns, via RETURN step 984, to the place from which the sub-routine 970 was called In the above described manner, the luminous intensity values of pixels representing a bitmapped image may be processed and adjusted, on a pixel by pixel basis, to reduce or eliminate color distortions introduced into an image as the result of treating different color pixel sub-components as independent luminance sources.

Figure 15:
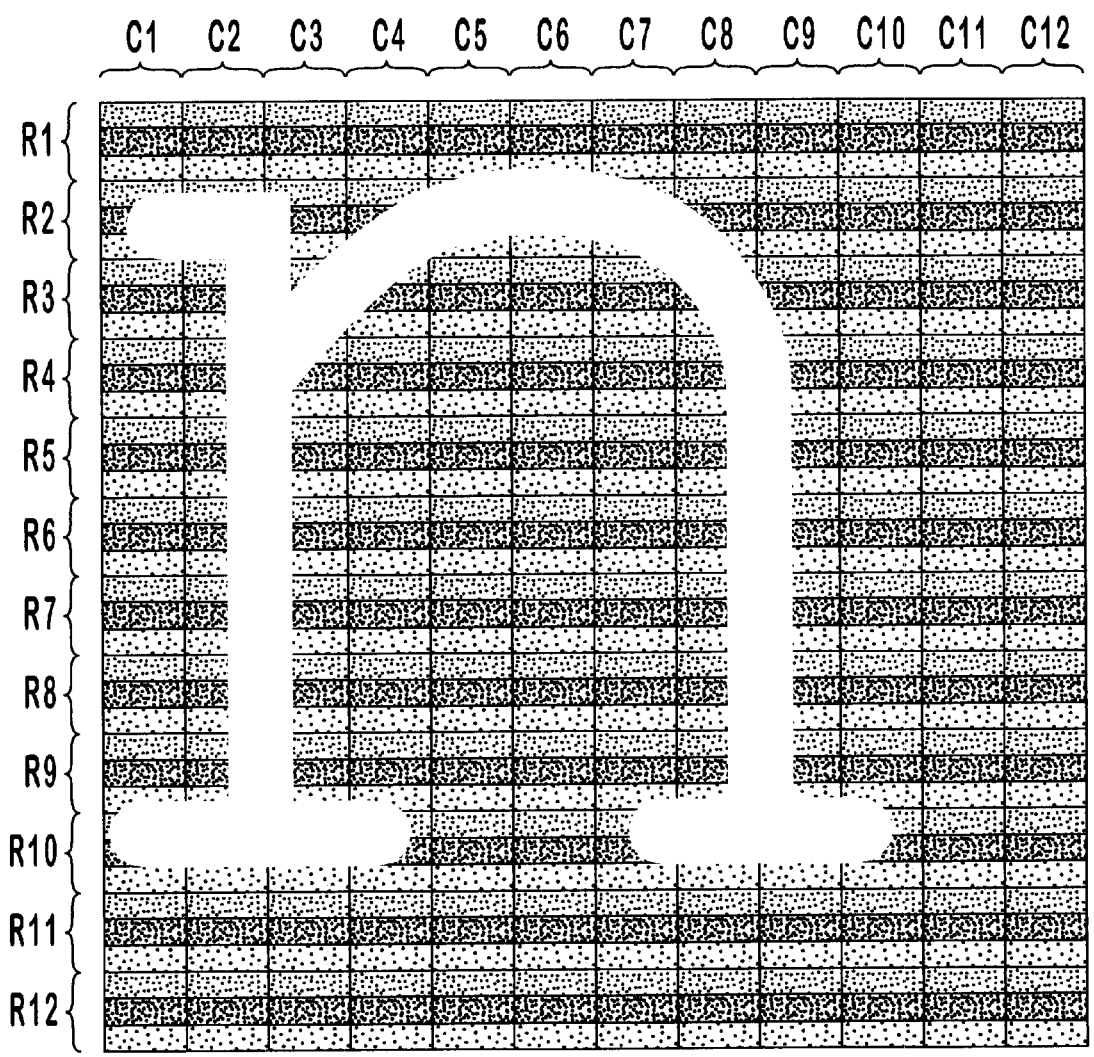
FIG. 15 illustrates a high resolution representation of a character to be displayed on a field of pixels.

FIG. 15 illustrates a high resolution representation of character n to be rendered superimposed on a grid representing an array of 12×12 pixels with horizontal striping.

Figure 16:
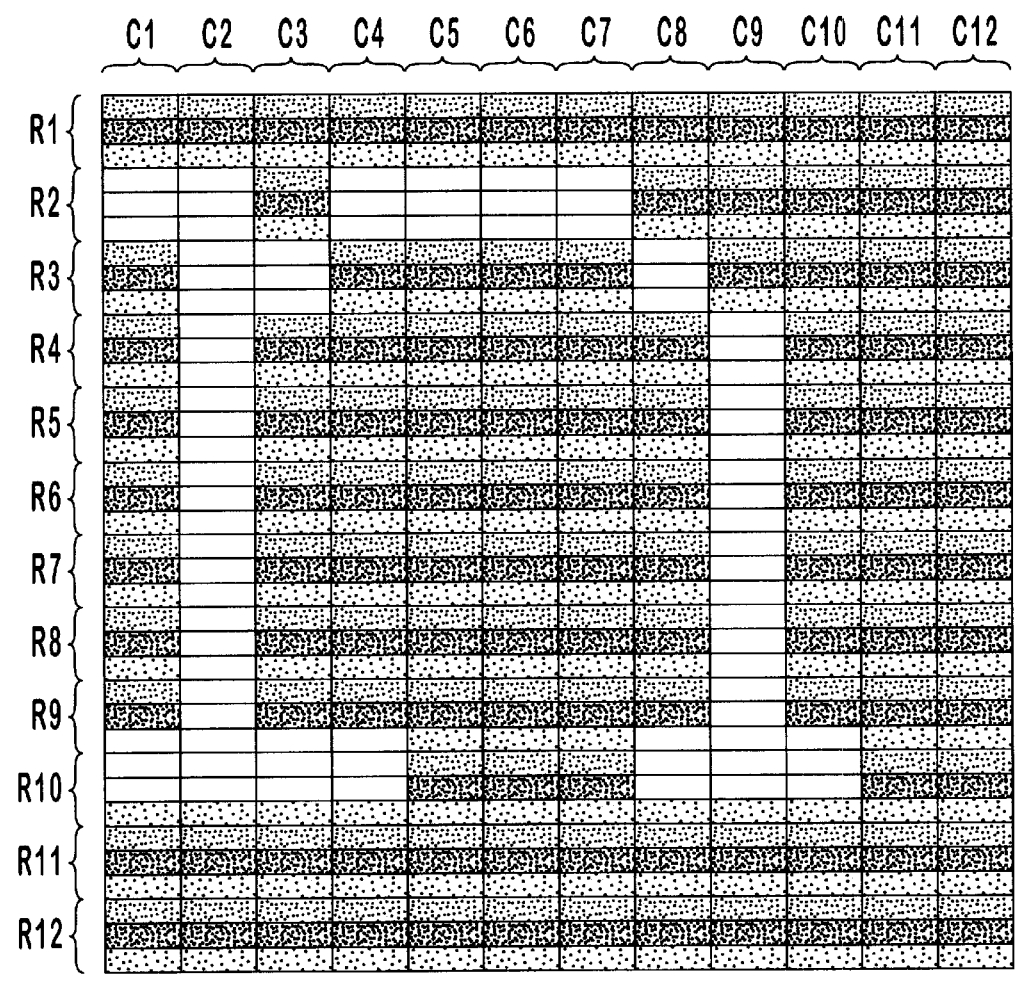

FIG. 16 illustrates how the character n illustrated in FIG. 15 would be rendered using conventional display techniques and full size pixel elements each including three pixel sub-components. Note how the full pixel size limitation results in relatively abrupt transitions in shape at the ridge of the letter resulting in aliasing and a relatively flat top portion.

Figure 17:
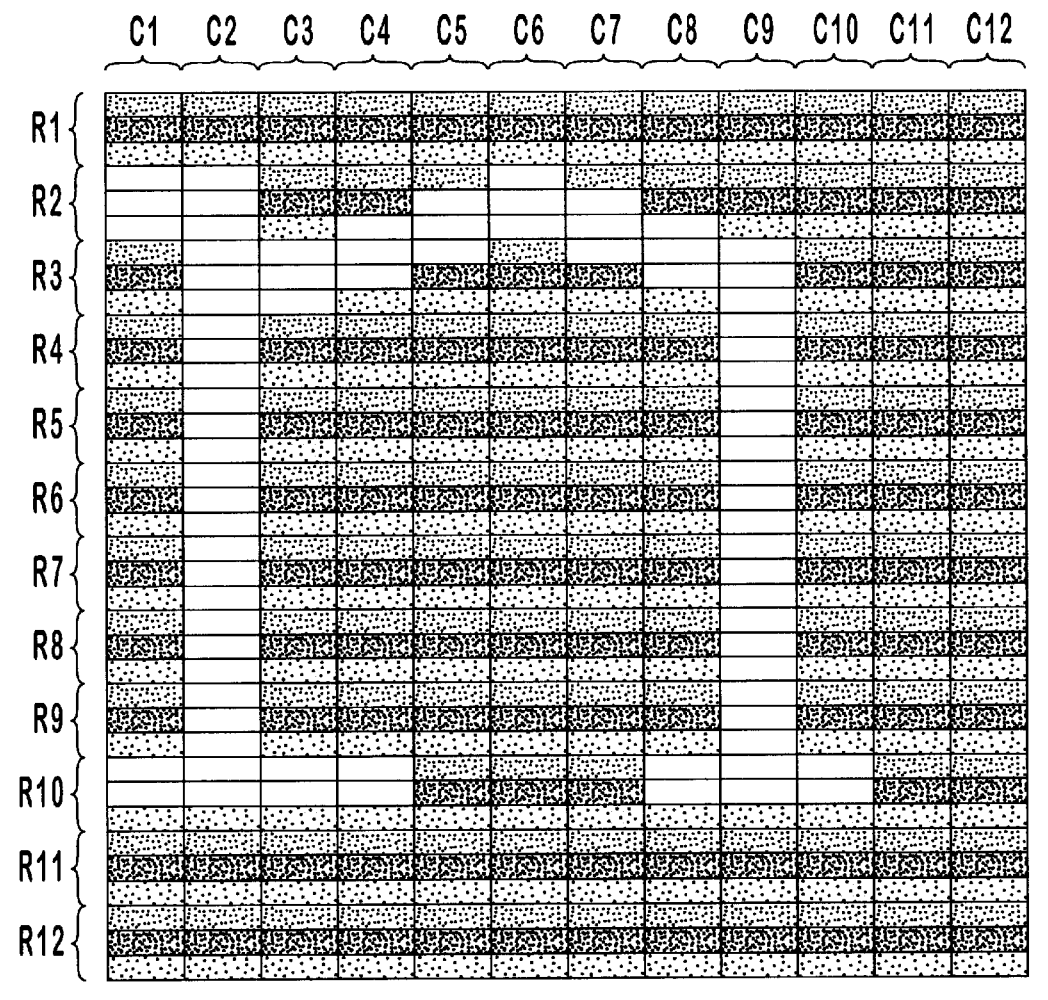

FIG. 17 illustrates how rendering of the letter n can be improved in accordance with the present invention by using a ⅔ pixel height base. The base is formed using 2 pixel sub-components as opposed to all three pixel sub-components in row 10, col. 1–4 and 8–10. Note also how the ridge of the letter has been improved by providing a ridge a full pixel height in width but with each horizontal full height pixel element staggered by a ⅓ pixel height in the vertical direction making for a much more accurate and smoother ridge than that illustrated in FIG. 16.

Figure 18:
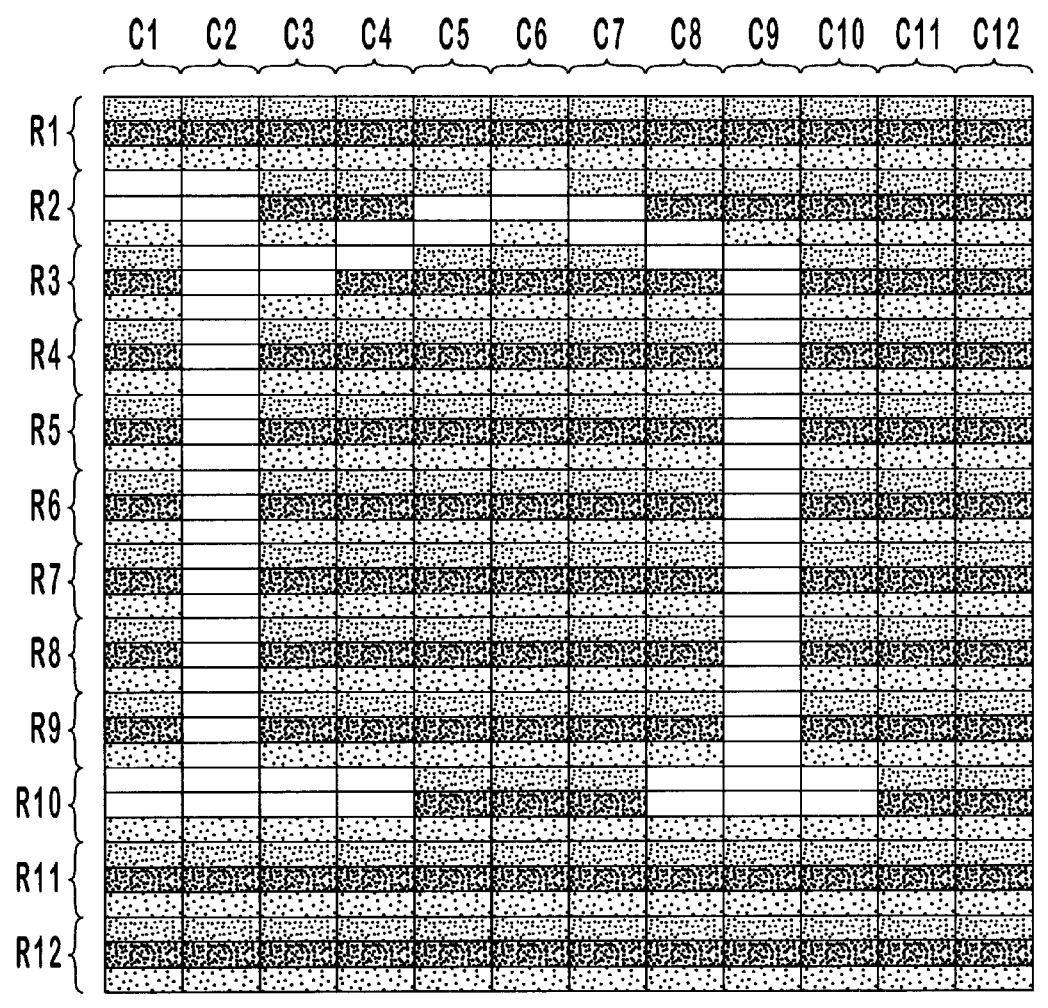

FIG. 18 illustrates how the ridge of the letter n can be reduced in thickness from one pixel in thickness to a ⅔ pixel thickness in accordance with the present invention.

Figure 19:
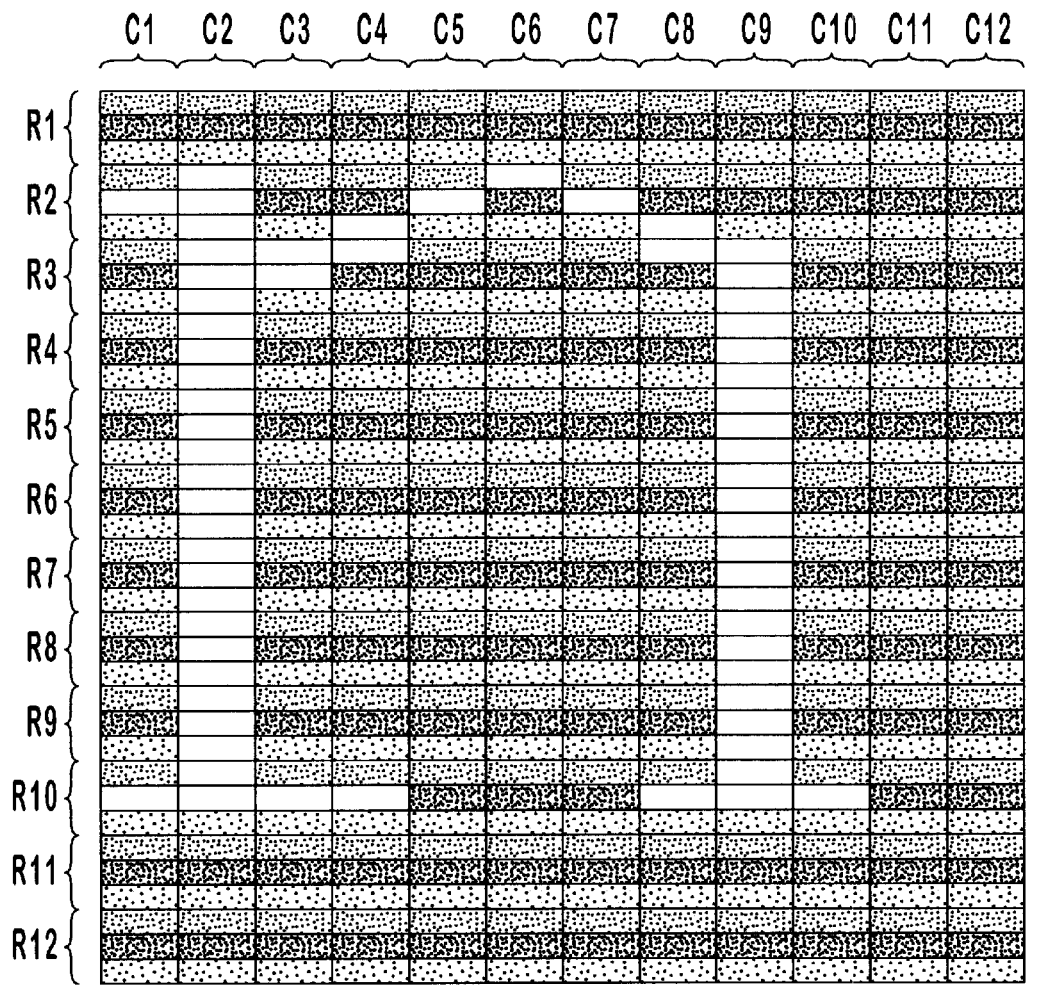

FIG. 19 illustrates how the base of the letter n can be reduced, in accordance with the present invention, to a minimal thickness of ⅓ that of a pixel. It also illustrates how portions of the ridge of the letter n can reduced to a thickness of ⅓ that of a pixel.

Figure 20:
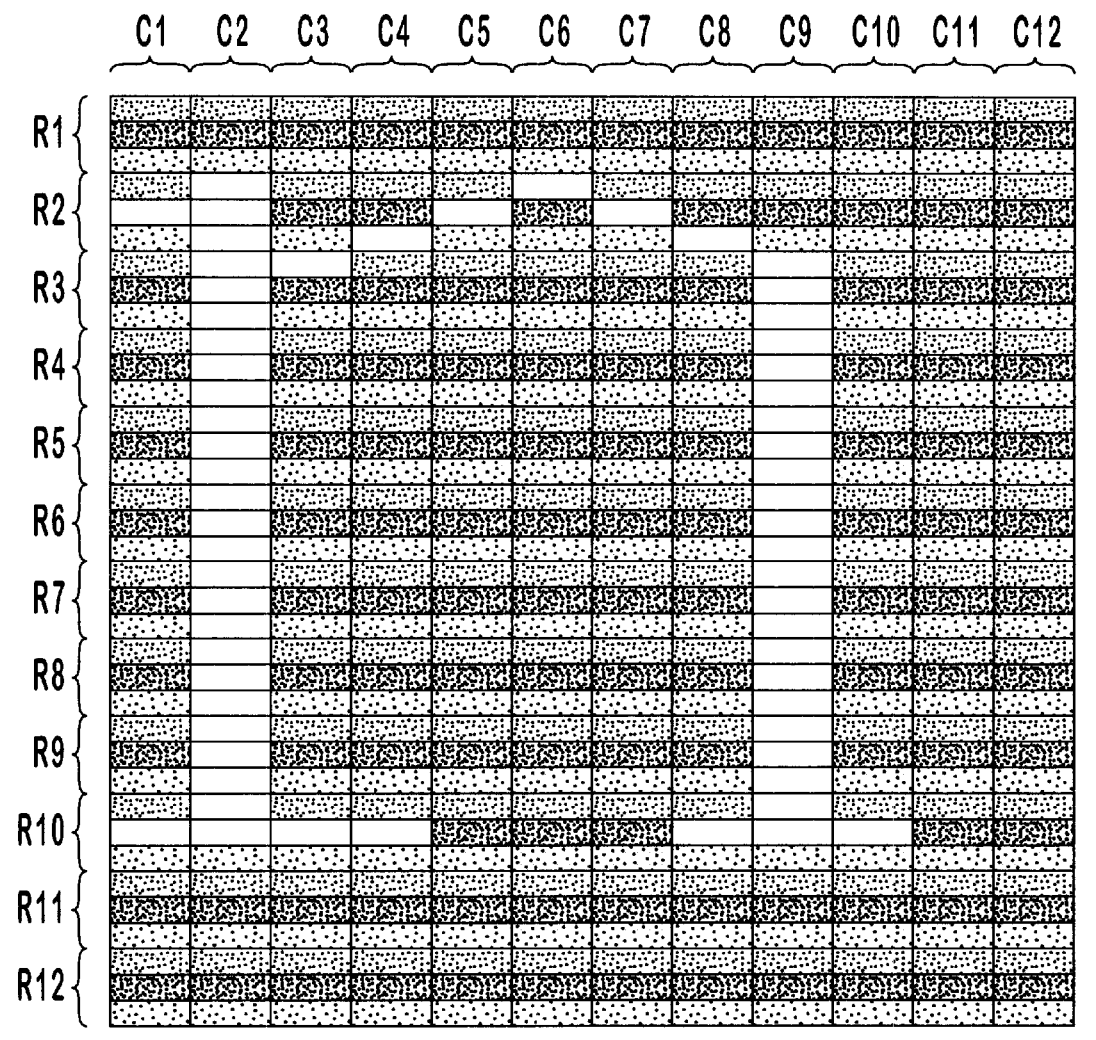

FIG. 20 illustrates how the letter n can be illustrated, in accordance with the present invention, with a base and ridge having a thickness of ⅓ that of a pixel.

While the present invention has been described largely in the context of rendering text, it is to be understood that the present invention can be applied to graphics as well to reduce aliasing and increase the effective resolution that can be achieved using striped displays such as conventional color LCD displays. In addition, it is to be understood that many of the techniques of the present invention can be used to process bitmapped images, e.g., scanned images, to prepare them for display.

In addition, it is to be understood that the methods and apparatus of the present invention can be applied to grayscale monitors which, instead of using distinct RGB pixel sub-components, use multiple non-square pixel sub-components, of the same color, to multiply the effective resolution in one dimension as compared to displays which use square pixel elements.

Figure 21A:
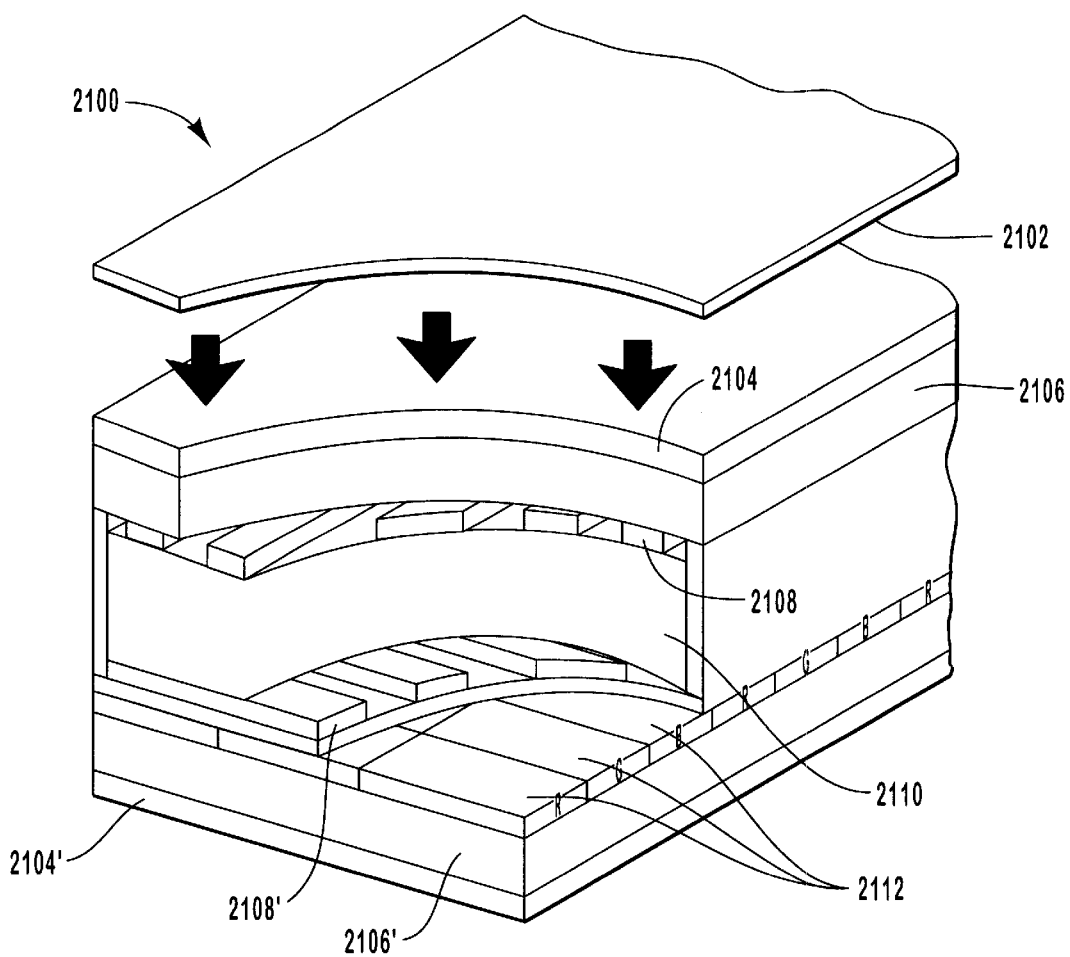
FIG. 21A illustrates the structure of a known color LCD screen.

FIG. 21A illustrates a known back light color LCD 2100. The LCD display 2100, is designed as a series of layered components. As illustrated, at the back of the display is a light source 2102 which provides light, e.g., white light, represented by the three arrows, to a first polarizing filter 2104. A first glass substrate layer 2106 separates the first polarizing filter 2104 from a first layer of transparent electrodes 2108. A layer of liquid crystal material 2110 is sandwiched between the first layer of transparent electrodes 2108 and a second layer 2108' which includes electrodes which run perpendicular to the direction of the electrodes in the first layer. A color filter 2112 including Red (R), Green (G), and Blue (B) filter segments, which run the vertical length of the display 2100, is placed in front of the second set of transparent electrodes 2108'. A second glass substrate 2106 separates the color filter 2112 and a second polarizing filter 2104' located at the front of the display 2100.

Light entering the first polarizing filter 2104 exists the display 2100 after passing through the electrode layers 2108, 2108', liquid crystal material 2110, color filter 2112 and second polarizing filter 2104'. The color filter 2112 determines the color of light output by any particular segment of the display 2100. By adjusting the voltage on the electrodes 2108, 2108', the intensity of light output via any segment of the display 2100 may be controlled.

Figure 21B:
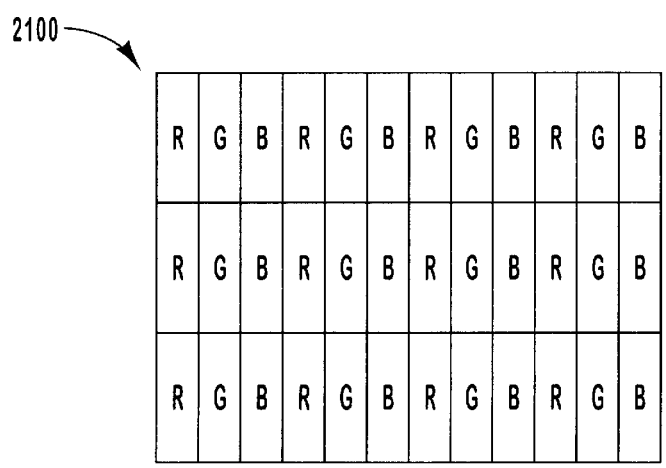
FIG. 21B shows the known screen of FIG. 21A as it would appear when viewed from the front.

FIG. 21B illustrates how the known screen 21A would appear when viewed from the front. Note how the R, G, and B segments of the color filter 2112 form vertical color stripes on the display 2100. Note also how the transparent electrodes can be controlled to form a plurality of separately controllable screen segments represented by the rectangular boxes labeled R, G, B. As with the known screen illustrated in FIGS. 2A and 2B, each pixel of an image may comprise one R, G and B display element to form a square pixel.

FIGS. 22A–24B illustrate displays implemented in accordance with various embodiments of the present invention. Components included in the displays illustrated in FIGS. 22A–24B, which are the same as or similar to the components of the known display 2100, are identified using the same reference numbers used in FIG. 21A. For the sake of brevity, such components will not be described again.

Figure 22A:
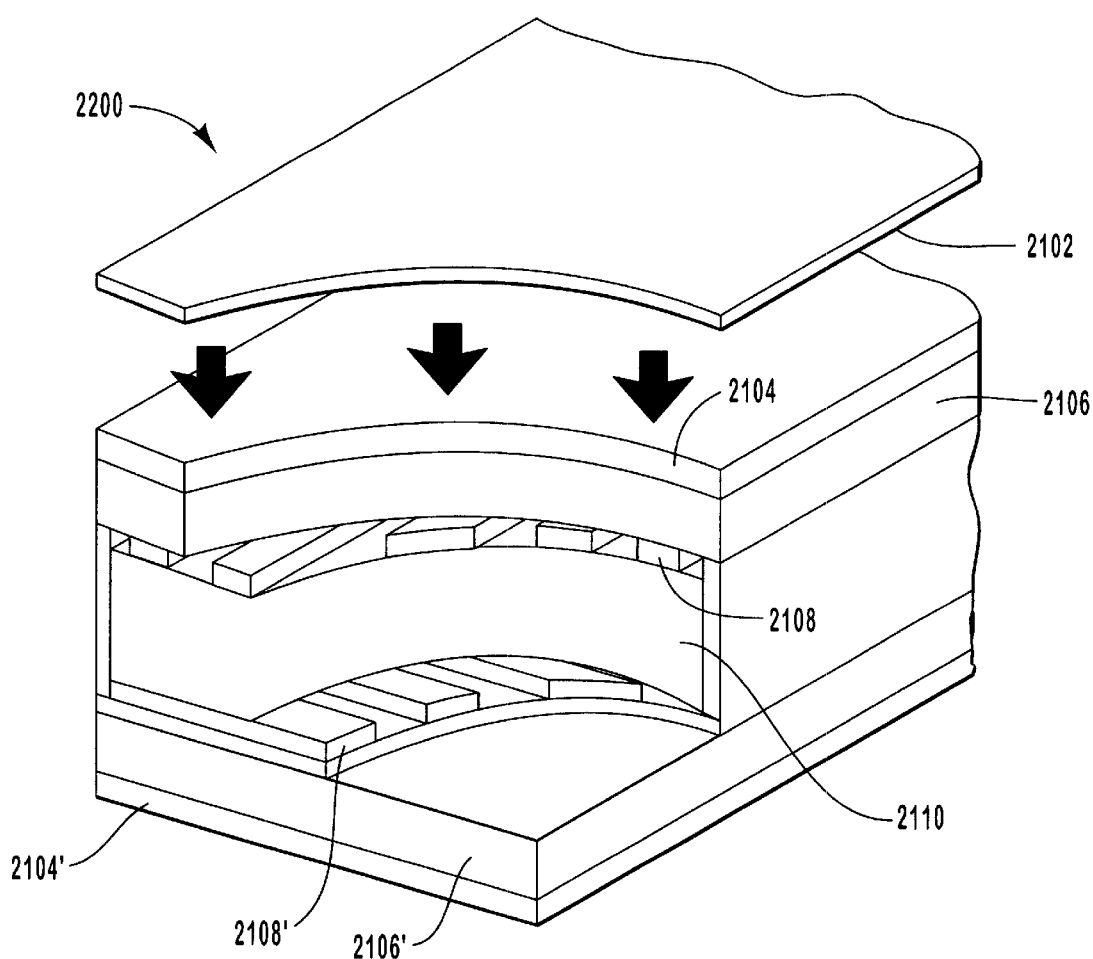
FIG. 22A illustrates the structure of a gray scale LCD implemented in accordance with one exemplary embodiment of the present invention.

FIG. 22A illustrates a gray scale LCD 2200 implemented in accordance with one embodiment of the present invention. The display 2200 comprises a back light 2102, first and second polarizing filters 2104, 2104', first and second glass substrates 2106, 2106', and first and second transparent electrode layers 2108, 2108' which are arranged to form a layered structure as illustrated in FIG. 22A. Note that the display 2200 lacks the color filter 2112 found in the known display 2100. Since the color filter 2112 is omitted, the light output of each separately controllable display segment will generally match the color of the back light 2102, e.g., will be white. The intensity of each display segment may be varied from full intensity to being fully off, e.g., by varying a voltage applied to electrodes 2108 and 2108'.

Figure 22B:
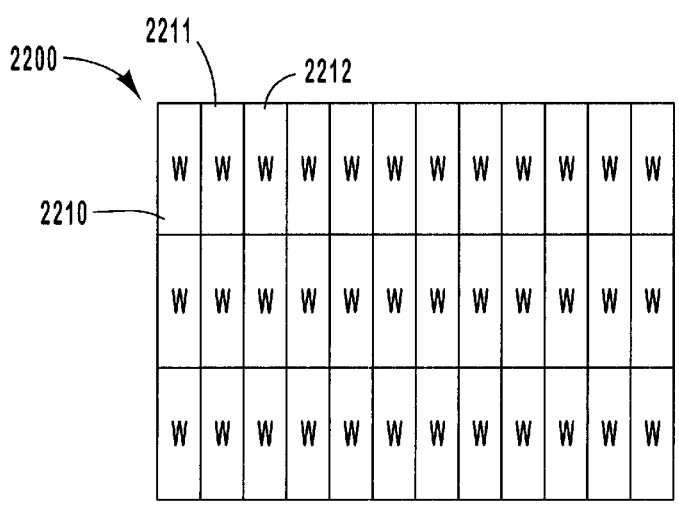
FIG. 22B shows the screen of FIG. 22A as it would appear when viewed from the front.

FIG. 22B illustrates how the display 2200 would appear when viewed from the front. Note how the display 2200 comprises a plurality of separately controllable luminous intensity sources in the form of rectangular display elements including, e.g., display elements 2210, 2211, 2212, each of which is the same color. Each display element 2210, 2210, 2213 comprises the portions of the sandwiched layers 2102, 2104, 2106, 2108, 2110 which correspond to the area of the individual display element 2210, 2211, 2213. In various embodiments of the present invention, the display elements are implemented so that their size in one dimension, e.g., the vertical dimension, is an integer multiple of their size in the other, e.g., horizontal dimension.

Various features of the present invention are directed to the use of adjacent display elements of the same color which form a display having a resolution in a first direction, e.g., the horizontal direction, that is a multiple of the resolution in a direction perpendicular to the first direction, e.g., the vertical direction. In the exemplary FIG. 22B embodiment, each display element 2210, 2211, 2212 is 3 times taller than it is wide. This results in a resolution in the horizontal direction that is three times the resolution in the vertical direction. However, non-square display elements with other height-width ratios are also contemplated and possible. In fact, displays with vertical resolutions that are greater than the horizontal resolutions may be implemented. In addition, the displays of the present invention may include any number of rows and/or columns of display elements. Each display element 2210, 2211, 2212 represents a separately controllable luminous intensity source.

The display 2200, is similar in construction to the display 2100, but is simpler to implement since the display 2200 lacks the color filter 2112 incorporated into the display 2100. While being simpler to construct than the known screen 2100, the gray scale display 2200 allows for the display of text and other images at a potentially higher resolution in one dimension than is possible using the conventional screen 2100 where color distortions may occur when treating pixel sub-components as independent luminance sources.

Because the display 2200 is a single color, it is particularly well suited for use as a gray scale monitor. Such a monitor is well suited for displaying, e.g., text in accordance with the present invention.

Because each controllable display element 2210, 2211, 2200 is of the same color, they can be treated as individual pixels. Alternatively, multiple non-square display elements can be grouped together to form square pixels. For example, display elements 2210, 2211 and 2213 may be grouped together to represent a single square pixel. In such a case, the scaling, grid fitting and scan conversion operations performed as part of an image, e.g., text, rendering operation would be the same as or similar to the methods described above in regard to the color embodiment of the present invention, e.g., each display element of a pixel would be treated as an independent luminous intensity source.

However, in the FIG. 22A embodiment all display elements, i.e., pixel sub-components, are of the same color. Accordingly, there is no need to use different weighting factors with different pixel sub-components since the pixel sub-components will contribute uniformly to the overall perceived luminance of a displayed image. In addition hinting and grid-fitting operations designed to align a character edge along a particular color boundary need not be performed since sub-pixel component color boundaries do not exist in the FIG. 22A embodiment. In addition, there would be no need for the color compensation step 915 since different color, e.g., RGB, pixel sub-components are not used.

Figure 23A:
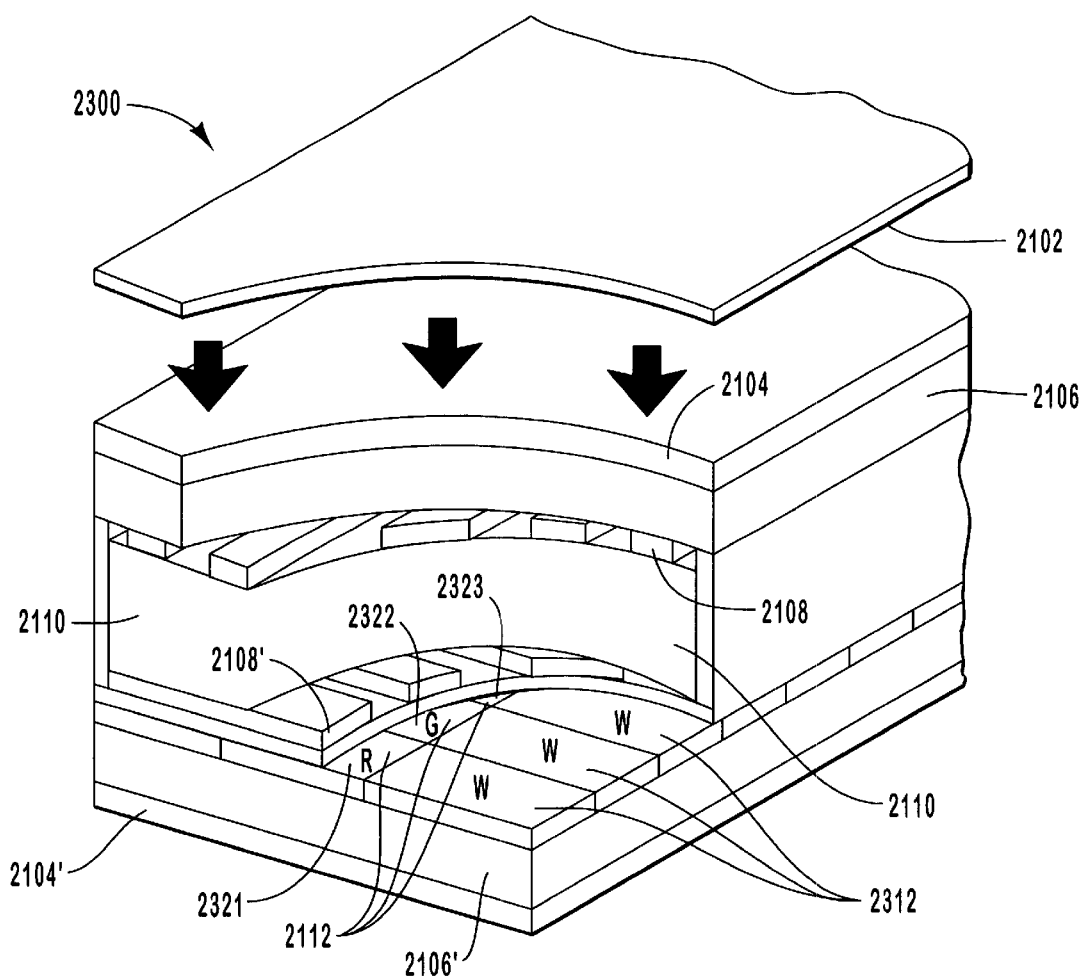
FIG. 23A illustrates the structure of an LCD having both color and gray scale portions implemented in accordance with the present invention.

FIG. 23A illustrates a display 2300 implemented in accordance with another embodiment of the present invention. In the FIG. 23A embodiment, a first, e.g., top, portion of the display is implemented as a gray-scale display while a second, e.g., bottom, portion of the display is implemented as a color display.

The display 2300 comprises a back light 2102, first and second polarizing filters 2104, 2104', first and second glass substrates 2106, 2106', first and second transparent electrode layers 2108, 2108', color filter 2112 and transparent spacers 2312 arranged to form a layered structure as illustrated in FIG. 23A. The color filter 2112 is positioned so that it filters the light passing through the lower portion of the screen 2300 while the clear spacers 2312 are located at the top, e.g., gray scale portion of the display 2300. The spacers 2312 allow light of any color to pass through, e.g., they pass white light when such light is generated by the backlight 2102. The clear spacers 2312 are of the same thickness as the color filter 2112. Thus, the spacers 2312 serve to maintain a uniform display thickness in the portions of the display where the color filter is omitted. The combination of the color filter 2112 and clear spacers 2312 may be described as a light filter with a plurality of cells where each cell corresponds to an individual display element 2302, 2304, 2306 or 2308 and where each cell is either clear or colored. Accordingly, each display element 2302, 2304, 2306, 2308 comprises the portions of the sandwiched layers 2102, 2104, 2106, 2108, 2110 and the light filter comprising elements 2112 and 2312, which correspond to the area of the individual display element.

The color filter 2112, comprises repeating R, G, and B stripes 2321, 2322, 2323 which run in the vertical direction. The color filter 2112 is included only in the lower portion of the display. Accordingly, the bottom portion of the display 2300 will support color output. The top portion of the display 2300, however, supports only a single color or gray scale output since different color filter strips are not employed in the top portion of the display 2300. The intensity of each segment of the display 2300 may be varied from full intensity to being fully off, e.g., by varying a voltage applied to electrodes 2108 and 2108'.

Figure 23B:
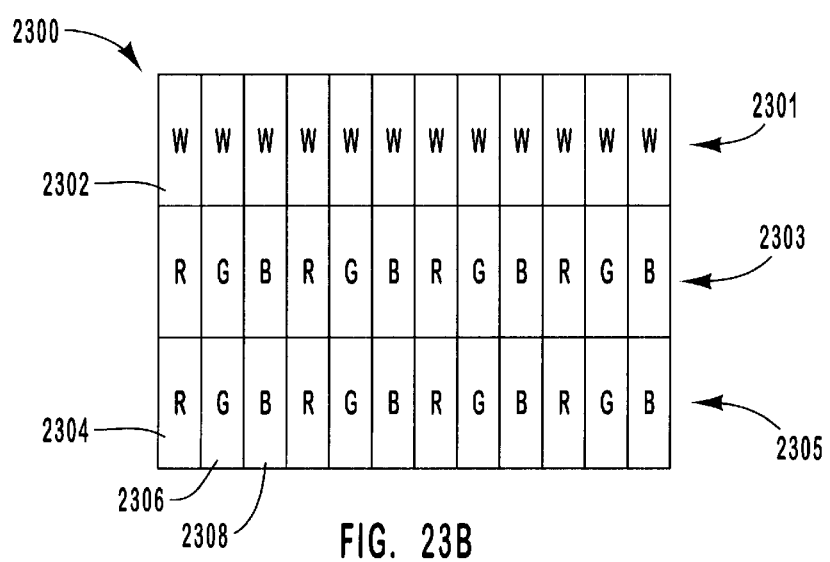
FIG. 23B shows the screen of FIG. 23A as it would appear when viewed from the front.

FIG. 23B illustrates how the display 2300 would appear when viewed from the front. Note how the display 2300 comprises a plurality of separately controllable luminous intensity sources each of which is represented as a separate rectangle in FIG. 23B. Reference numeral 2302 is used to indicate a white display element, e.g., luminous intensity source, while reference numerals 2304, 2306 and 2308 are used to indicated red, green and blue display elements respectively. Note that in FIG. 23B a single row 2301 of white display elements 2302 and two rows 2303, 2305 of colored display elements 2304, 2306, 2308 are illustrated. However, any combination of white (gray scale) and colored display elements is possible. In addition, any number of rows and/or columns of display elements are possible.

While FIG. 23B illustrates a single row 2301 of gray scale pixel elements of the same color, multiple rows and/or columns of such pixel elements will normally be included in a display and grouped together, e.g., to support the display of text.

The display 2300 is well suited for applications where a portion of the display screen is to be dedicated to the display of text while another portion is to be used, e.g., for color graphics. For example, a display of the present invention having a gray scale portion at the top or bottom may be used for displaying captioning information using the display's gray scale portion while the color portion may be used for displaying color images. Such a display has the advantage of providing higher resolution and/or easier to read text than an RGB display having display elements of the same size while still allowing for the display of color graphics.

As discussed above, gray-scale monitors implemented in accordance with the present invention can produce easier to read text than RGB striped monitors having display elements of the same size. This is because gray scale monitors do not suffer from color distortions relating to treating pixel sub-components as independent luminous intensity sources. Many displays are used for displaying text at one time and displaying color graphics at another time. In addition, different portions of a single display are commonly used to display text and color graphics at the same time. The particular portion of the display used for text may vary depending on the amount of text information and/or the image being displayed along with the text.

Figure 24A:
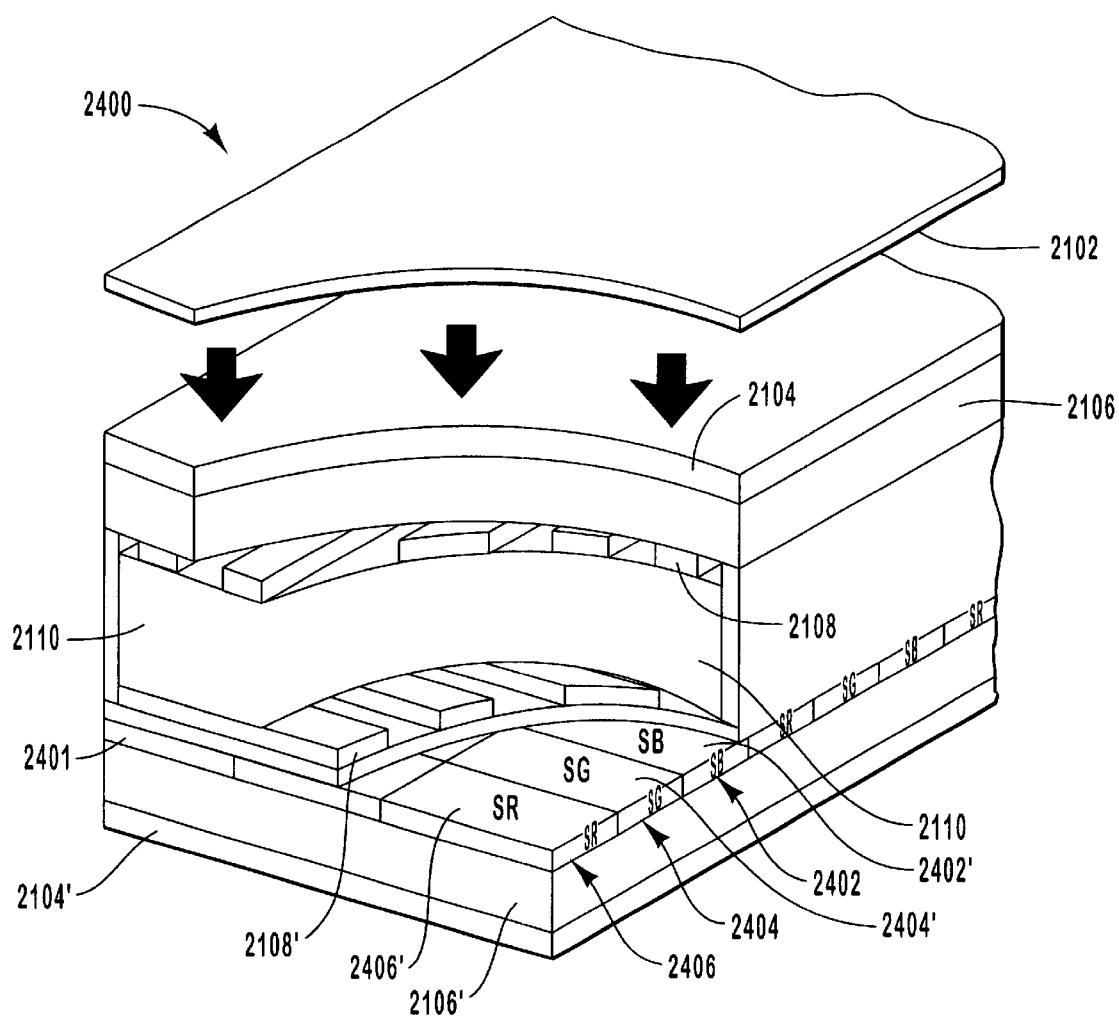
FIG. 24A illustrates the structure of an LCD implemented in accordance with another embodiment of the present invention all or portions of which can be switched between color and gray scale modes of operation.

To support the gray scale display of text and color images in such varied applications, one embodiment of the present invention is directed to a display device which includes a filter having filter cells which are capable of switching between color and clear modes of operation. A display 2400 implemented in accordance with such an exemplary embodiment of the present invention is illustrated in FIGS. 24A and 24B.

The display 2400 comprises a back light 2102, first and second polarizing filters 2104, 2104', first and second glass substrates 2106, 2106', first and second transparent electrode layers 2108, 2108', and a switchable color filter 2401 arranged to form a layered structure as illustrated in FIG. 22A. Note that the display 2400 is similar in construction to the known display 2100 with the exception of the color filter. The known display used a fixed striped color filter while the display 2400 of the present invention uses a striped switchable color filter 2401.

The color filter 2401 comprises a plurality of switchable red 2406, green 2404 and blue 2402 filter stripes. Each filter stripe 2406, 2404, 2402 includes a plurality of separately controllable filter cells 2406', 2404' and 2402', respectively. Each filter cell corresponds to an individual display element representing, e.g., a red, green or blue pixel sub-component respectively, when operating in color mode and a gray scale display element, e.g., gray scale pixel or pixel sub-component, when operating in gray scale mode. The voltage applied to electrodes incorporated into each cell of the switchable color filter 2401 may be varied to change the cell from a colored to a clear or transparent mode of operation. Thus, the individual filter cells 2406' in stripe 2406 may be independently controlled to operate as red or clear filter cells. In addition, the individual filter cells 2404' in stripe 2404 may be independently controlled to operate as green or clear filter cells. Furthermore, the individual filter cells 2402' in stripe 2402 may be independently controlled to operate as blue or clear filter cells. The luminous intensity of each display element may be varied from full intensity to being fully off, e.g., by varying a voltage applied to electrodes 2108 and 2108' and/or by varying the voltage applied to electrodes included in each filter cell corresponding to a display element.

Figure 24B:
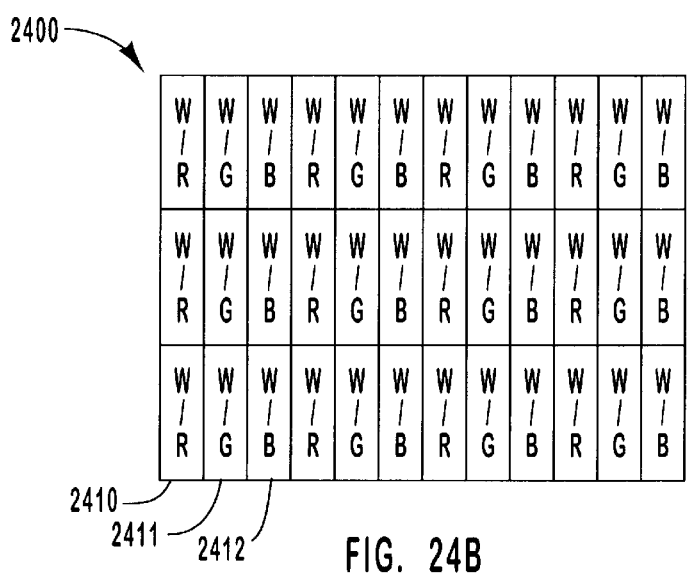
FIG. 24B shows the screen of FIG. 24A as it would appear when viewed from the front.

FIG. 24B illustrates how the display 2400 would appear when viewed from the front. Note how the display 2400 comprises a plurality of separately controllable luminance sources in the form of display elements, e.g., display elements 2410, 2411, 2412, each of which can be switched between a red, green or blue modes of operation, respectively, and a gray scale mode of operation. Each display element 2410, 2412, 2212 comprises the portions of the sandwiched layers 2102, 2104, 2106, 2108, 2401 which correspond to the area of the individual display element 2410, 2411, 2413.

The display elements 2410, 2411, 2412 are illustrated as being taller than they are wide in FIGS. 24A and 24B. It is to be understood that display elements of other sizes may also be employed, e.g., resulting in square display elements or display elements which are wider than they are tall. In addition, it is to be understood that while three rows and 9 columns of display elements are illustrated in FIG. 24B, a display can be built with any number of rows and/or columns of display elements.

An alternative to using the switchable red, green and blue filter stripes 2406, 2404, 2402 would be to replace such switchable filter stripes with switchable yellow filter stripes or stripes of another, single color. Filter stripes capable of switching between a color, e.g., yellow, and a clear mode of operation, may be used to, e.g., highlight text being displayed.

When using the display 2400, a determination is made at the time of rendering as to whether or not the image to be displayed corresponds to text or another type of graphic image. For portions of the display 2400 which are to be used for the display of text, the filter cells are set to a gray scale, e.g., clear, mode of operation. For portions of the display 2400 which are to be used for the display of non-text images, the filter cells are normally set to a color mode of operation. This approach allows for gray scale text display in accordance with the present invention while still allowing for the color display of images anywhere on the display device 2400.

Setting of the filter cells' mode of operation may be achieved by sending one or more filter mode control signals, e.g., filter mode control commands, to a display device incorporating the display 2400. The filter mode control commands indicate the mode in which filter cells associated with, e.g., identified in the commands are to operate. The filter mode control commands are generated by the rendering and rasterization routines 807 as part of the text rending process, or, alternatively, by the video adapter 548. In one RGB embodiment, the default is to have the switchable filter cells operate in color mode and require a command to change to a clear state, e.g., for text rendering. In a yellow/clear embodiment, the default mode is the clear mode of operation with a command being used to initiate a yellow mode of filter cell operation.

A display device incorporating the display 2400 includes control logic which is responsive to the filter mode control commands. The control logic generates the necessary electrical signals, in response to received commands, to change the mode of operation of display filter cells.

While the term "clear" has been used to describe the character of the filter cells 2410, 2411, 2412 when operating in gray scale mode, it is to be understood that they may include a slight tint of color due to difficulties in producing a perfectly clear filter that can also serve as a red, green or blue color filter. Accordingly, in some embodiments the filter cells 2410, 2411 and 2412 are only substantially clear when operating in gray-scale display mode. In any event, at least in one exemplary embodiment, when operating in gray-scale mode the filter cells 2410 pass red, green and blue light which is not the case when operating in color mode.

While various methods and apparatus of the present invention have been described in the context of liquid crystal display devices or in the context of being used with liquid crystal displays, many of the methods and apparatus of the present invention can be used with, and improve, image quality on a number of types of output and display devices.

For example, the scaling, scan conversion and hinting methods discussed above which involve treating different color pixel sub-components as independent luminous intensity sources, may be applied to images which are to be displayed on cathode ray tube (CRT) displays.

Printers represent another class of output devices to which the scaling, hinting and scan conversion operations of the present invention may be applied. The methods and apparatus of the present invention are particularly well suited for use with ink jet and other types of printers where portions of an image are represented by displaced (offset) color samples printed on a fixed medium, e.g., paper.

While liquid crystal (LCD) and other types of display devices often share certain common characteristics, e.g., the use of RGB pixel sub-components to represent a pixel, specific display characteristics, e.g., color filter characteristics, may vary from manufacturer to manufacturer. Display, e.g., monitor, characteristics may also vary between different types of monitors produced by the same manufacturer.

One embodiment of the present invention takes into consideration differences between different monitors by storing anti-aliasing information, e.g., weighting factor information, for specific display devices, in memory. The rasterization and rendering routines of the present invention utilize this display device information when available for the particular display device being used in a given application. Accordingly, in various embodiments of the present invention, anti-aliasing and gamma correction operations are implemented using stored filter weights and gamma values associated with individual models of display devices, e.g., LCD screens.

Anti-aliasing operations are performed in various above described embodiments in one dimension through the use of different red, green and blue weights used during the scan conversion process. The application of anti-aliasing techniques in a second dimension are contemplated, and in various exemplary embodiments are employed to further enhance image quality.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed is:

1. A liquid crystal display device having an array of display elements capable of switching between a substantially gray scale mode of operation and a color mode of operation, comprising:

an array of display elements, each representing a pixel sub-component of the display device, each display element of the array including a switchable filter cell that is separately and selectively controllable with respect to the switchable filter cells included in the other display elements of the array and that is separate from the switchable filter cells included in the other display elements of the array, thereby enabling the display element to operate in either of two modes of operation and to switch between the two modes of operation by varying the voltage applied to an electrode associated with the switchable filter cell, wherein the two modes of operation include:
  a color filter mode of operation for displaying an image in color, wherein, when the display element operates in the color filter mode, the portion of the image represented by the display element is displayed using a color associated with the particular display element, the array of display elements including display elements having different associated colors when operating in the color filter mode; and
  a substantially gray scale mode of operation for displaying an image in a gray scale, wherein, when the display element operates in the substantially gray scale mode of operation, the portion of the image represented by the display element is displayed using a gray scale substantially without color; and
  a back light that provides light for the display elements, such that the liquid crystal display device operates as a back light liquid crystal display device.

2. The display device of claim 1, wherein the plurality of display elements are rectangular display elements which are longer in a first direction than in a second direction.

3. The display device of claim 2, wherein the color filter mode of operation of a first subset of the plurality of display elements is a red color filter mode of operation.

4. The display device of claim 3, wherein the display elements included in the first subset of the plurality of display elements are arranged to form stripes on the display device.

5. The display device of claim 4, wherein the color filter mode of operation of a second subset of the plurality of display elements is a green color filter mode of operation.

6. The display device of claim 5, wherein the display elements included in the second subset of the plurality of display elements are arranged to form stripes on the display device.

7. The display device of claim 6, wherein the color filter mode of operation of a third subset of the plurality of display elements is a blue color filter mode of operation.

8. The display device of claim 7, wherein the display elements included in the third subset of the plurality of display elements are arranged to form stripes on the display device.

9. A method of displaying an image using a liquid crystal display device having a plurality of display elements including switchable filter cells capable of operating in either of a color mode and a gray scale mode and capable of switching between the color mode and the gray scale mode, the method comprising the steps of:
  in response to receiving a non-text image to be displayed, causing a first set of the switchable filter cells to operate in the color mode by applying a first voltage to electrodes associated with the first set of switchable filter cells, wherein the first set of switchable filter cells are also capable of operating in the gray scale mode;
  displaying the non-text image in color using a first set of display elements that represent pixel sub-components of the display device and include the first set of switchable filter cells operating in the color mode, each of the display elements in the first set of display elements including a switchable filter cell that is separate from the switchable filter cells included in the other display elements of the first set and that is separately and selectively controllable with respect to the switchable filter cells included in the other display elements of the first set, wherein the portions of the non-text image displayed by the first set of display elements are displayed using a plurality of colors, each color being associated with one or more of the first set of display elements;
  in response to receiving a text image to be displayed, causing a second set of the switchable filter cells to operate in the gray scale mode by applying a second voltage to electrodes associated with the second set of switchable filter cells, wherein the second set of switchable filter cells are also capable of operating in the color mode; and
  displaying the text image in a gray scale using a second set of display elements that represent pixel sub-components of the display device and include the second set of switchable filter cells operating in the gray scale mode, each of the display elements in the second set of display elements including a switchable filter cell that is separate from the switchable filter cells included in the other display elements of the second set and that is separately and selectively controllable with respect to the switchable filter cells included in the other display elements of the second set, wherein the portions of the text image displayed by the second set of display elements are displayed using the gray scale substantially without color and are rendered with a resolution that is as fine as the dimension of a single display element substantially without experiencing color distortions that would otherwise be experienced if the text image were to be displayed at said resolution using the color mode.

10. The method of claim 9, wherein:
  the method further comprises the step of receiving a filter cell mode control command; and
  the step of causing the second set of filter cells to operate in the gray scale mode is performed as a function of the received filter cell mode control command.

11. The method of claim 9, wherein the step of causing the second set of filter cells to operate in the gray scale mode includes the step of causing said second set of filter cells to become substantially clear when in the gray scale mode such that white light can pass through the second set of filter cells in a substantially transparent manner.

12. The method of claim 9, further comprising, after the steps of displaying the text image in the gray scale and displaying the non-text image in color, the steps of:
  receiving another non-text image to be displayed;
  causing the second set of filter cells to switch from the gray scale mode to the color mode by applying another voltage, different from the second voltage, to the electrodes associated with the second set of filter cells; and
  displaying the other non-text image in color using the display elements that include the second set of filter cells operating in the color mode.

13. In a system that includes a liquid crystal display device having display elements including switchable filter cells that enable the display elements to operate in either of a color mode and a gray scale mode, a method for displaying an image on the display device comprising the steps of:
  generating a plurality of luminous intensity values that represent at least a portion of an image, each of the luminous intensity values corresponding to a display element of the display device, wherein the switchable filter cells of the display elements of the display device are capable of causing the corresponding display elements to operate in either of the color mode and the gray scale mode and to switch between the color mode and the gray scale mode, and wherein the display elements represent pixel sub-components of the display device, each display element including one of said switchable filter cells that is separately and selectively controllable with respect to the switchable filter cells included in other display elements and that is separate from the switchable filter cells included in the other display elements;

generating a filter cell mode control command which indicates that the switchable filter cells included in at least one of said display elements is to cause the corresponding display element to operate in a specified mode selected from the color mode and the gray scale mode;

transmitting the plurality of luminous intensity values and the filter cell mode control command to the display device;

in response to receiving the filter cell mode control command, causing the display elements corresponding to the luminous intensity values to operate in the specified mode indicated by the filter cell mode control command by applying a specified voltage to electrodes associated with the switchable filter cells; and displaying said at least a portion of the image on the display device using the display elements corresponding to the luminous intensity values in the specified mode.

14. A computer readable medium for use with a system that includes a liquid crystal display device having display elements including switchable filter cells that enable the display elements to operate in either of a color mode and a gray scale mode, the computer readable medium comprising:

computer executable instructions for generating and outputting display information relating to the display of an image on the display device, the generation and outputting of display information including the steps of:

generating a plurality of luminous intensity values that represent at least a portion of an image, each of the luminous intensity values corresponding to a display element of the display device, wherein the switchable filter cells of the display elements of the display device are capable of causing the corresponding display elements to operate in either of the color mode and the gray scale mode and to switch between the color mode and the gray scale mode, and wherein the display elements represent pixel sub-components of the display device, each display element including one of said switchable filter cells that is separately and selectively controllable with respect to the switchable filter cells included in other display elements and that is separate from the switchable filter cells included in the other display elements;

generating a filter cell mode control command which indicates that the switchable filter cell included in at least one of said display elements is to cause the corresponding display element to operate in a specified mode selected from the color mode and the gray scale mode;

transmitting the plurality of luminous intensity values and the filter cell mode control command to the display device;

in response to receiving the filter cell mode control command, causing the display elements corresponding to the luminous intensity values to operate in the specified mode indicated by the filter cell mode control command by applying a specified voltage to electrodes associated with the switchable filter cells; and displaying said at least a portion of the image on the display device using the display elements corresponding to the luminous intensity values in the specified mode.

15. The liquid crystal display device of claim 1, further comprising another plurality of display elements that are capable of operating only in the substantially gray scale mode of operation for displaying images in the gray scale.

16. The method of claim 9, wherein the steps of displaying the text image in a gray scale and displaying the non-text image in color are conducted such that the text image and the non-text image are displayed on the display device simultaneously.

17. The method of claim 9, further comprising the step of displaying another text image on another portion of the display device, said other portion including other display elements that are capable of operating only in the gray scale mode.

* * * * *

UNITED STATES PATENT AND TRADEMARK OFFICE
CERTIFICATE OF CORRECTION

PATENT NO. : 6,577,291 B2
DATED : June 10, 2003
INVENTOR(S) : William Hill et al.

It is certified that error appears in the above-identified patent and that said Letters Patent is hereby corrected as shown below:

Column 2,
Line 51, after "common" change "columnxrow" to -- column x row --
Line 57, before "manufactured" delete "are"

Column 11,
Line 27, after "sub-components" delete "components"

Column 17,
Line 5, after "image" change "columns" to -- rows --

Column 22,
Line 21, after "value" change "RN" to -- $R_N$ --

Column 24,
Line 31, after "called" insert a period
Line 63, before "reduced" insert -- be --

Column 25,
Line 34, after "filter 2104" change "exists" to -- exits --

Column 26,
Lines 10-11, after "element" change "2210, 2210, 2213" to -- 2210, 2211, 2212 --
Line 13, after "2211" change "2213" to -- 2212 --

Column 27,
Line 54, before "red" change "indicated" to -- indicate --

UNITED STATES PATENT AND TRADEMARK OFFICE
CERTIFICATE OF CORRECTION

PATENT NO.    : 6,577,291 B2
DATED         : June 10, 2003
INVENTOR(S)   : William Hill et al.

It is certified that error appears in the above-identified patent and that said Letters Patent is hereby corrected as shown below:

<u>Column 29,</u>
Line 42, change "commands" to -- command --

Signed and Sealed this

Eighteenth Day of November, 2003

JAMES E. ROGAN
*Director of the United States Patent and Trademark Office*